(12) United States Patent
Rubak et al.

(10) Patent No.: US 7,340,899 B1
(45) Date of Patent: Mar. 11, 2008

(54) SOLAR POWER GENERATION SYSTEM

(75) Inventors: Jeffrey Rubak, Lake Forest, CA (US); Michael Yambrach, Vista, CA (US)

(73) Assignee: Solar Energy Production Corporation, Vista, CA (US)

( * ) Notice: Subject to any disclaimer, the term of this patent is extended or adjusted under 35 U.S.C. 154(b) by 0 days.

(21) Appl. No.: 11/258,830

(22) Filed: Oct. 26, 2005

Related U.S. Application Data

(60) Provisional application No. 60/522,660, filed on Oct. 26, 2004.

(51) Int. Cl.
*B60R 16/00* (2006.01)

(52) U.S. Cl. .................... 60/641.8; 60/641.2

(58) Field of Classification Search ........... 60/641.8, 60/641.11, 641.12; 126/571
See application file for complete search history.

(56) References Cited

U.S. PATENT DOCUMENTS

| | | | |
|---|---|---|---|
| 4,079,591 A | | 3/1978 | Derby et al. |
| 4,103,493 A | * | 8/1978 | Schoenfelder ........... 60/641.11 |
| 4,189,922 A | | 2/1980 | Bellofatto |
| 4,266,404 A | | 5/1981 | ElDifrawi |
| 4,376,435 A | * | 3/1983 | Pittman ...................... 126/563 |
| 4,388,542 A | | 6/1983 | Lovelace et al. |
| 4,459,814 A | * | 7/1984 | Schaetzle ..................... 62/175 |
| 4,628,692 A | | 12/1986 | Pierce |
| 4,947,825 A | * | 8/1990 | Moriarty ..................... 126/685 |
| 5,005,360 A | | 4/1991 | McMurtry |
| 5,228,293 A | * | 7/1993 | Vitale ....................... 60/641.14 |
| 5,419,135 A | | 5/1995 | Wiggs |
| 5,685,152 A | * | 11/1997 | Sterling ..................... 60/641.8 |
| 5,806,317 A | | 9/1998 | Kohler et al. |
| 5,974,804 A | | 11/1999 | Sterling |

(Continued)

FOREIGN PATENT DOCUMENTS

JP          55-010083          1/1980

(Continued)

OTHER PUBLICATIONS

Maycock, Paul D., *Photovoltaics PV market update, Global PV production continues to increase*, Renewable Energy World Review Issue 2005-2006, vol. 8 No. 4, pp. 86-99, Jul.-Aug. 2005.

(Continued)

*Primary Examiner*—Hoang Nguyen
(74) *Attorney, Agent, or Firm*—Knobbe Martens Olson & Bear LLP

(57) ABSTRACT

An economical solar generator system is provided wherein the solar energy collector is constructed from a plurality of heat exchangers of the kind used as evaporators in automobile air conditioners. The solar generator system includes a plurality of said heat exchangers connected to receive incoming liquefied refrigerant under pressure. The number of such heat exchangers is sufficient to collect solar energy sufficient to induce a phase change from a liquid to a gas state. The solar generator system also includes an air motor and an electric generator. The air motor is coupled to the outflow heated gas from the plurality of heat exchangers. The air motor is rotated by the heated gas. The electrical generator is coupled to the air motor so that rotation of said air motor causes rotation of said generator.

30 Claims, 17 Drawing Sheets

U.S. PATENT DOCUMENTS

| | | | |
|---|---|---|---|
| 6,000,211 A * | 12/1999 | Bellac et al. | 60/775 |
| 6,128,903 A | 10/2000 | Riege | |
| 6,233,914 B1 | 5/2001 | Fisher | |
| 6,237,337 B1 | 5/2001 | Bronicki et al. | |
| 6,321,539 B1 | 11/2001 | Bronicki et al. | |
| 6,474,089 B1 * | 11/2002 | Chen | 62/235.1 |
| 6,672,064 B2 | 1/2004 | Lawheed | |
| 6,694,738 B2 | 2/2004 | Bronicki et al. | |
| 6,899,097 B1 | 5/2005 | Mecham | |
| 2004/0035111 A1 | 2/2004 | Ven et al. | |

FOREIGN PATENT DOCUMENTS

| | | |
|---|---|---|
| JP | 55-082242 | 6/1980 |
| JP | 56-075915 | 6/1981 |
| JP | 57-019552 | 2/1982 |
| WO | WO 03/072384 A1 | 9/2003 |

OTHER PUBLICATIONS

Jones, Jackie, *Solar Thermal, Getting Warmer*, Renewable Energy World Review Issue 2005-2006, vol. 8 No. 4, pp. 124-133, Jul.-Aug. 2005.

Jones, Jackie, *Photovoltaics The growth challenge*, Renewable Energy World Review Issue 2005-2006, vol. 8 No. 4, pp. 146-157, Jul.-Aug. 2005.

Sklar, Scott, *Solar Thermal, Sleepers that are coming to light*, Renewable Energy World Review Issue 2005-2006, vol. 8 No. 4, pp. 170-177, Jul.-Aug. 2005.

Nordmann, Thomas, *Photovoltaics Built-in future*, Renewable Energy World Review Issue 2005-2006, vol. 8 No. 4, pp. 236-247, Jul.-Aug. 2005.

Author Unknown, *CH Series Liquid Chiller, FLATPLATE®*, marketing pamphlet, date unknown, 2 pages, volume-issue number unknown, publisher unknown.

Author Unknown, *51H Air Turbine Motor, TDI Tech Development*, marketing pamphlet, date unknown, 2 pages, volume-issue number unknown, publisher unknown.

Author Unknown, *Delphi Condensers, DELPHI*, marketing pamphlet, date unknown, 2 pages, volume-issue number unknown, publisher unknown.

Author Unknown, *Centrifugal, Booster & Turbine Pumps, McMaster-Carr*, internet catalog excerpt, 4 pages, volume-issue number unknown, publisher unknown.

Author Unknown, *MAGAPLUS® marketing pamphlet*, Marathon Electric®, marketing pamphlet, date unknown, 6 pages, volume-issue unknown, publisher unknown, printed in the U.S.A.

Author Unknown, *All Energy for Europe Could Come from Concentrating Solar Power*, www.RenewableEnergyAccess.com, article posted on the internet with reader commentary, 5 pages, Jul. 17, 2006, publisher unknown.

Author Unknown, *Pneumatic Tools and Equipment, Compressed Air and Gas Data*, date unknown, p. 29-2, volume-issue unknown, publisher unknown.

Sandler, Neal, *Israeli Solar Startup Shines, Business Week—Online*, internet article and reader commentary, Feb. 14, 2006, 5 pages, publisher unknown.

* cited by examiner

SOLAR POWER GENERATION SYSTEM

CROSS-REFERENCE TO RELATED APPLICATIONS

This application claims the benefit of U.S. Provisional Application No. 60/522,660, filed Oct. 26, 2004.

BACKGROUND OF THE INVENTION

1. Field of the Invention

This application is directed to economical solar generator systems.

2. Description of the Related Art

There is an enormous amount of solar energy provided by the sun that is available without significant environmental impact, or "green". This energy is essentially free, in that it continually falls on the surface of the earth. The amount of energy impinging at any particular locale is a function of the geographic location, adverse atmospheric conditions, and season change. However, for many terrestrial locations, a great deal of solar energy impinges on the earth's surface every day. Unlike other sources of energy, solar energy does not require exploration, extraction of materials or refining.

Some efforts to harness this energy have been pursued, but with limited success. In one approach, photovoltaic ("PV") devices, made of specialized silicon materials, are able to directly convert sunlight into electricity. Though simple and clean, even after years of development, PV devices remain quite expensive and cost prohibitive, resulting in long pay back periods. Also, PV devices produce relatively low voltage direct current (DC), which has generally limited PV devices to local use incompatible with using PV devices to support the grid.

Solar thermal is another branch of solar energy exploitation. This approach is similar to traditional electricity generation in that the energy of the sun drives a power plant, such that electricity is produced indirectly. Solar thermal efforts have focused on matching the efficiencies of traditional power plants that burn fossil fuels. Such efforts have required complex devices, such as focusing concentrating mirrors to heat oil to very high temperatures. In addition, very special oil handling structures are required, e.g., high performance seals to prevent leakage of the very high temperature oil. Although a few operating plants have been built, the cost of designing and building these plants is very high. Thus, these plants are not remotely economical and there is little, if any, return of investment. Because the economics do not justify these plants and because very few geographic locations are suitable, no economies of scale are available to make these plants more viable. These and other factors make traditional solar thermal plants economically unviable.

For at least these reasons, only a small fraction, currently less than one percent, of electricity produced in the United States exploits solar energy.

SUMMARY OF THE INVENTION

Therefore, there is a need for economically viable approaches to producing electricity by collecting solar energy. The approaches described herein meet that need by including low cost, stock components and devices rather than custom components and devices that incorporate exotic materials. These approaches recognize that an economically viable system can be achieved with lesser efficiencies but with less expensive components.

In one embodiment, an economical solar generator system is provided that includes a solar energy collector that is constructed from a plurality of heat exchangers of the kind used as condensers in automotive air conditioners or as radiators in engines. The solar generator system includes a plurality of said heat exchangers connected to receive incoming liquefied refrigerant under pressure, the number of such heat exchangers being interconnected is sufficient to raise the temperature of refrigerant to the range of 120° F. to about 190° F. and induce a phase change from the liquid to the gaseous state. The solar generator system also includes a pump, an air motor, and an electric generator. The pump is coupled to the plurality of heat exchangers for providing the incoming refrigerant under pressure. The air motor is coupled to the outflow heated gas from the plurality of heat exchangers and is rotated by the heated gas. The electrical generator is coupled to the air motor so that rotation of the air motor causes rotation of the generator. The solar generator system also includes a condenser in fluid communication with the air motor to induce a phase change in the refrigerant from a gas phase to a liquid phase. The output of the condenser is coupled to the pump.

In another embodiment, an economical solar generator system is provided wherein the solar energy collector is constructed from a plurality of heat exchangers of the kind used as condensers in automobile air conditioners or as radiators in engines. The solar generator system includes a plurality of said heat exchangers connected to receive incoming liquefied refrigerant under pressure. The number of such heat exchangers is sufficient to collect solar energy sufficient to induce a phase change from a liquid to a gas state. The solar generator system also includes a pump, an air motor, an electric generator, and a condenser. The pump is coupled to the plurality of heat exchangers and provides said incoming refrigerant under pressure. The air motor is coupled to the outflow heated gas from the plurality of heat exchangers. The air motor is rotated by said heated gas. The electrical generator is coupled to the air motor so that rotation of said air motor causes rotation of said generator. The condenser is in fluid communication with the air motor to induce a phase change in the refrigerant from a gas phase to a liquid phase. The output of said condenser is coupled to said pump.

In another embodiment, an economical solar generator system is provided. The solar energy collector is constructed from a plurality of heat exchangers of the kind used as condensers in automobile air conditioners or as radiators in engines. The solar generator system includes a plurality of said heat exchangers connected to receive an incoming heat storage fluid and a secondary heat exchanger connected to receive the heat storage fluid from said heat exchangers. The secondary heat exchanger also is connected to receive incoming liquefied working fluid under pressure. The secondary heat exchanger is configured to transfer sufficient heat from the heat storage fluid to the working fluid to induce a phase change in the working fluid from a liquid to a gas state. The solar generator system also includes a pump, an air motor, and an electric generator. The pump is coupled to the secondary heat exchanger for providing the incoming working fluid under pressure. The air motor is coupled to the outflow heated gas working fluid from said secondary heat exchanger whereby said air motor is rotated by said heated gas working fluid. The electrical generator is coupled to said air motor so that rotation of said air motor causes rotation of said generator. The system also includes a condenser in fluid communication with said air motor. The condenser induces a phase change in said working fluid from a gas phase to a liquid phase, the output of said condenser coupled to said pump.

In another embodiment, an economical solar generator system is provided that includes a solar energy collector. The solar energy collector is constructed from a plurality of heat exchangers of the kind used as condensers in automotive air conditioners or as radiators in engines. The solar generator system comprises a plurality of said heat exchangers connected to receive incoming liquefied refrigerant under pressure. The number of such heat exchangers being interconnected is sufficient to raise the temperature of refrigerant. The system also includes a pressurized refrigerant source coupled to said plurality of heat exchangers and an air motor coupled to the outflow heated gas from said plurality of heat exchangers. The air motor is rotated by said heated gas. The system also includes an electrical generator coupled to said air motor so that rotation of said air motor causes rotation of said generator. The system also includes a condenser in fluid communication with said air motor to induce a phase change in said refrigerant from a gas phase to a liquid phase. The output of the condenser is coupled to said pump. The condenser comprises a first liquid storage tank and a second liquid storage tank. The first liquid storage tank is configured to hold a volume of cooling liquid sufficient to supply the condenser for at least one day. The cooling liquid is introduced into the condenser at a first temperature. The second liquid storage tank is configured to hold at least one day's volume of cooling liquid. The cooling liquid is introduced into the second liquid storage tank at a second temperature that is higher than the first temperature. At least one of the liquid storage tanks is configured to promote sufficient passive heat transfer to cool the cooling liquid during the night at least to the first temperature.

In another embodiment, an economical solar generator system is provided that includes a solar energy collector. The solar energy collector is constructed from a plurality of heat exchangers of the kind used as condensers in automotive air conditioners or as radiators in engines, said solar generator system comprising:

a plurality of said heat exchangers connected to receive incoming liquefied refrigerant under pressure, the number of such heat exchangers being interconnected being sufficient to raise the temperature of refrigerant;

a pressurized refrigerant source coupled to said plurality of heat exchangers;

an air motor coupled to the outflow heated gas from said plurality of heat exchangers whereby said air motor is rotated by said heated gas;

an electrical generator coupled to said air motor so that rotation of said air motor causes rotation of said generator; and a condenser in fluid communication with said air motor to induce a phase change in said refrigerant from a gas phase to a liquid phase, the output of said condenser coupled to said pump, said condenser comprising:

a first liquid storage tank configured to hold a volume of cooling liquid sufficient to supply the condenser for at least one day, the cooling liquid being introduced into the condenser at a first temperature; and a second liquid storage tank configured to hold at least one day's volume of cooling liquid, the cooling liquid being introduced into the second liquid storage tank at a second temperature that is higher than the first temperature;

wherein at least one of the liquid storage tanks is configured to promote sufficient passive heat transfer to cool the cooling liquid at least to the first temperature.

In some embodiments, an economical solar generator system is provided that has a primary heat source that collects a renewable resource and a secondary heat source that consumes a non-renewable resource. The renewable resource may be solar energy flux collected in a suitable manner, e.g., by a plurality of heat exchangers. The non-renewable resource may be a fossil fuel that can be combusted to add heat to the system.

DETAILED DESCRIPTION OF THE PREFERRED EMBODIMENT

As discussed further below, the embodiments described are advantageously configured to be constructed mainly of stock components and thus at comparatively low cost so that electrical power is produced in an economically viable manner. The systems are environmentally friendly in that they convert a renewable resource, e.g., solar energy flux from the sun, into electrical power. This application discusses a variety of electrical power generation systems.

I. Systems Configured to Generating Electrical Power Ecnomically from Solar Energy Flux The systems described below operate by heating a working fluid solely with solar energy flux and by one or more additional heat sources, some of which can be non-renewable.

A. Direct Heating of a Working Fluid with Solar Energy Flux

Figure 1:
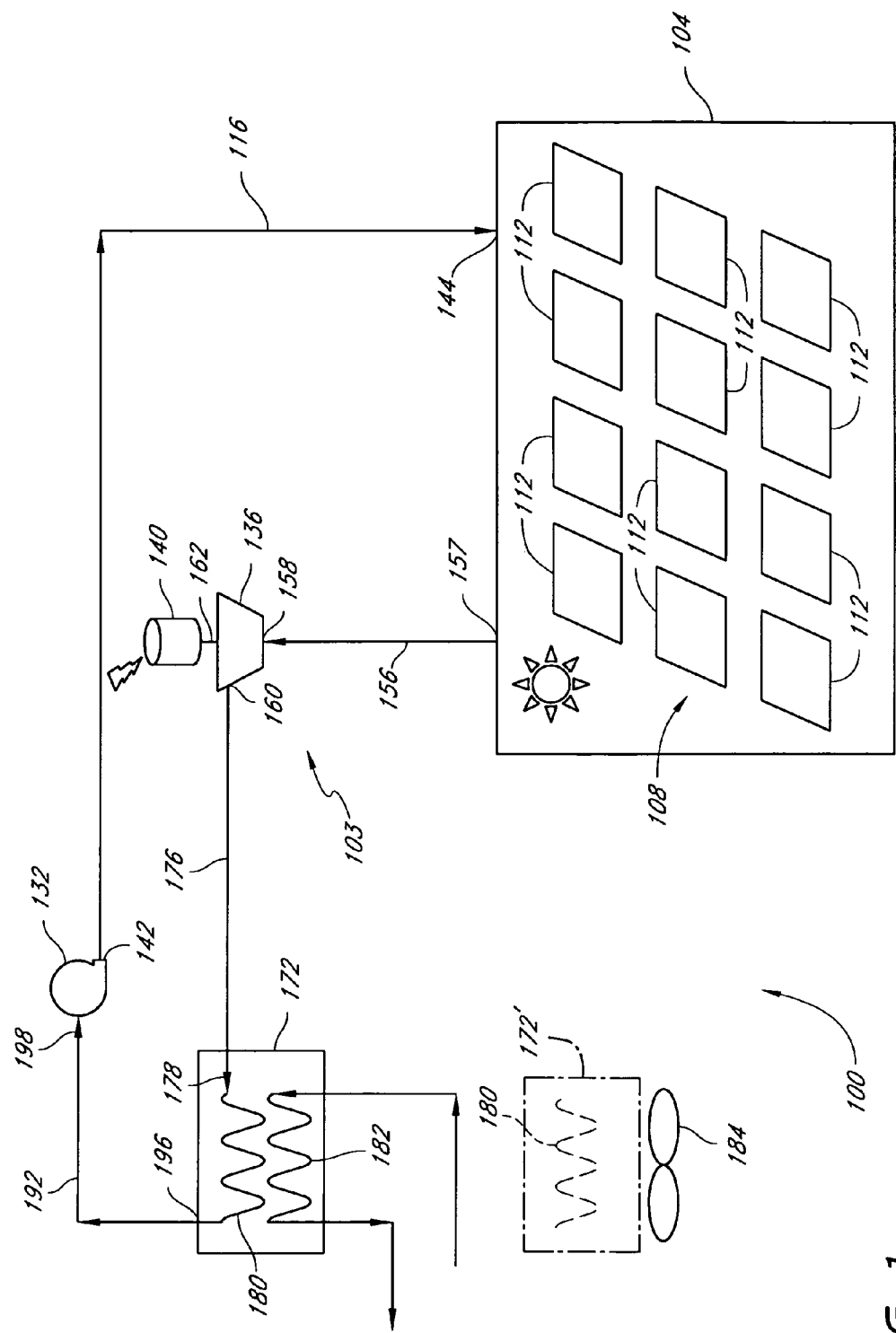
FIG. 1 is a schematic diagram of one embodiment of a solar generator system that includes a heat exchanger of the kind used as condensers in an automotive air conditioner or as radiators in engines.

FIG. 1 schematically illustrates one embodiment of an economical solar generator system 100. As discussed further below, the solar generator system 100 can operate on a suitable thermodynamic cycle. The system 100 also uses mostly stock components to generate electrical power. The system 100 is scalable such that a plurality of modules can be coupled together to produce anywhere form about 20 kilowatts to about 20 megawatts or more. By using stock components and scalability, the system produces a significant amount of electrical power without requiring highly efficient, complex, expensive components to increase the system's efficiency. In some variations, however, higher efficiency components can be included if the economics of the application justify such components.

The solar generator system 100 includes an electric power generation loop 103 in which an electric generator is driven by a working fluid in a gas phase. As discussed further below, solar energy flux is collected and imparted to the working fluid to convert the working fluid to gas phase.

Figure 5:
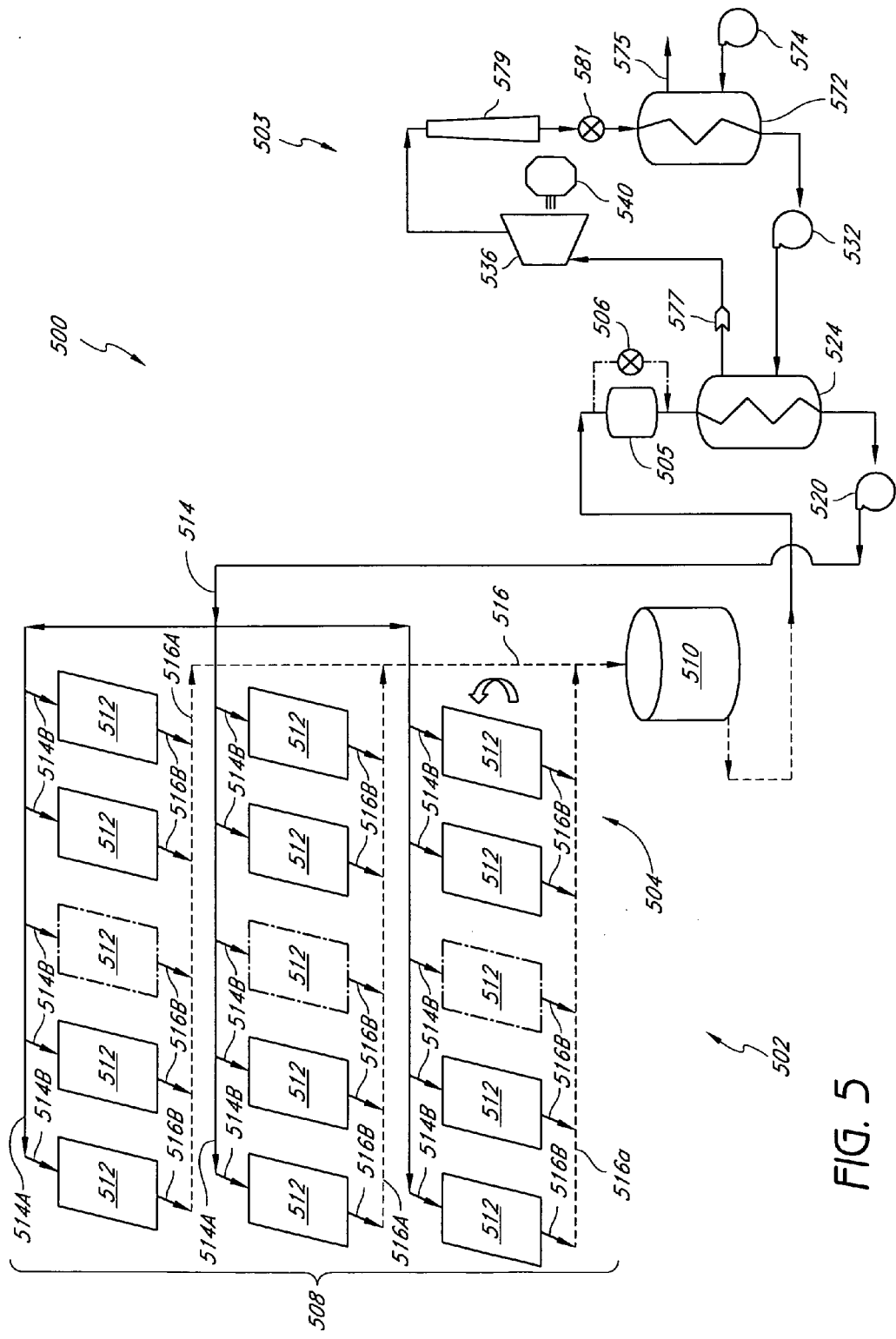
FIG. 5 is a schematic diagram of one variation of the system of FIG. 3.

The solar generator system 100 includes a solar energy collector 104 that is configured, e.g., positioned and oriented, to collect solar radiation flux. The solar energy collector 104 is configured as a solar panel field 108, though other suitable configurations can be provided. The solar panel field 108 includes a plurality of heat exchangers 112 in one arrangement. The heat exchangers 112 are sometimes referred to herein as solar heat exchangers. The solar panel field 108 can be configured as a regular array, for example having twelve heat exchangers in three rows and four columns, as shown in FIG. 1. FIG. 5 illustrate that in other embodiment, the solar panel field 108 can include other numbers or arrangements of heat exchangers and the heat exchangers can be configured in parallel as well as (or instead of) in series. A series or parallel arrangement can be selected to minimize pressure drop of the fluid in the solar panel field 108, which is related to the power requirements of the pump that pushes the fluid through the heat exchangers, as discussed below. Also, a series or parallel arrangement can be selected to maximize temperature rise through the solar panel field 108.

In some embodiments, the heat exchangers 112 are discrete units that can be connected together in a suitable manner. For example, in one arrangement the heat exchangers 112 are connected in series, such that fluid flowing in the system 100 flows successively through each of the heat exchangers 112 during each cycle. Thus, solar energy flux collected by each of the heat exchangers 112 provides an increase in heat energy to the working fluid in the system 100 to raise the temperature of or convert the state of the working fluid, as discussed further below. The solar panel field 108 can include a plurality of heat exchangers 112 or can include as few as one heat exchanger that is capable of collecting enough solar energy flux and transferring heat therefrom the working fluid to drive the electric power generation loop 103, as discussed below.

The number of heat exchangers 112 in the solar panel field 108 can be selected based on the heat energy needed to transform the working fluid from a liquid to a gas phase. In one arrangement, the number of heat exchangers 112 included in the solar panel field 108 is selected to be sufficient to raise the temperature of the working fluid (e.g., a refrigerant) in the solar generator system 100 to a temperature in the range of about 140° Fahrenheit (60° Celsius) to about 190° Fahrenheit (88° Celsius). In another arrangement, the number of heat exchangers 112 included in the solar panel field is selected to be sufficient to raise the temperature of the working fluid in the solar generator system 100 to a temperature in the range of about 120° Fahrenheit (49° Celsius) to about 190° Fahrenheit (88° Celsius) and to induce a phase change from the liquid to the gaseous state. In some systems and in some applications, higher temperatures can be reached, e.g., more than 190° Fahrenheit. In other systems and arrangements, the elevated refrigerant temperature is lower, e.g., at or around 120° Fahrenheit. The lower temperature systems are more suitable for cold climates, winter operation, and where chilled water is available.

In another arrangement, the number of heat exchangers 112 included in the solar panel field 108 is selected to be sufficient to raise the temperature of the fluid in the solar generator system 100 to a temperature in the range of about 160° Fahrenheit (71° Celsius) to about 180° Fahrenheit (82° Celsius). In another arrangement, the number of heat exchangers 112 included in the solar panel field is selected to be sufficient to raise the temperature of the working fluid in the solar generator system 100 to a temperature in the range of about 160° Fahrenheit (71° Celsius) to about 180° Fahrenheit (82° Celsius) and to induce a phase change from the liquid to the gaseous state.

The working fluid can include one or more suitable refrigerants. In various embodiments, the working fluid includes one or more of HCFC-123, HCFC-124, HCFC-236, R-245 or equivalents or any other suitable refrigerants. These and other suitable refrigerants can be obtained from various suppliers, including Honeywell and Dupont.

In one economical arrangement, the heat exchangers 112 are stock heat exchangers, e.g., of the kind used as condensers in automotive air conditioners or as radiators in engines. The heat exchangers 112 are sometimes referred to herein as "radiators." One embodiment of the system 100 includes one or more stock radiators that can also be used for automotive applications. As used herein, the term "stock" is a broad term that includes components that are based closely on a generally available design, but that can include minor modifications, for example related to manufacturing or ease of assembly. A "stock radiator" can be a radiator based closely on a generally available automotive design. The term "stock radiator" also includes radiators that can be manufactured on a manufacturing line also capable of producing automotive radiators, or in a facility that manufactures automobile radiators without significantly re-tooling the facility. As discussed further below, a "stock" component also can be one that is modified by replacing one or only a few sub-components, such as a seal, to make the component more suitable for use in the system described herein. As discussed further below, a factory air motor and a factory pump can be made more suitable by replacing factory seals with suitable seals that are compatible with the fluids of the systems described herein.

In the illustrated embodiment, the electric power generation loop 103 includes a conduit 116 that conveys the working fluid to the solar panel field 108. The conduit 116 and the other conduits described herein can be a suitable hose or pipe in some embodiments. The solar generator system 100 preferably transports the working fluid under pressure in the conduit 116. As discussed further below, the working fluid can be pressurized and directed through the conduit 116 by a pump or in any other suitable manner. Preferably the conduit 116 is capable of transporting the working fluid at a pressure between about 80 psig and about 150 psig. In other embodiments, the conduit 116 can convey working fluids at a pressure of about 150 psig or more. In other embodiments, the conduit 116 can convey working fluids at a pressure of about 80 psig or less. Preferably at least a substantial portion or all of the working fluid in the conduit 116 is in liquid form. In some embodiments, the conduit 116 transports the working fluid to the plurality of heat exchangers 112, which receive working fluid under pressure. In some embodiments, the conduit 116 is formed of conventional, inexpensive flexible tubing, e.g., rubber tubing.

The heat exchangers 112 are configured to provide sufficient heat transfer performance for the solar generator system 100. Preferably the heat exchangers 112 transfer heat collected form incident solar energy flux to the working fluid efficiently. In some arrangements, the majority or substantially the entire heat exchanger 112 is made of a lightweight, high performance material, such as aluminum. Other arrangements of the heat exchanger 112 employ aluminum components and components of other suitable materials. In some applications it is preferred that the heat exchanger 112 be compact in size. A compact size can be achieved by providing louvered convoluted fins adjacent the flow path of the working fluid. The heat exchanger 112 preferably also is substantially entirely sealed to prevent the working fluid from escaping.

The heat exchanger 112 can comprise stock components that are produced by a variety of suppliers, including Delphi Corporation. The Compact Tube Center Condenser, the Headered Tube and Center Condenser, and the Tube and Fin Condenser are commercially available components from Delphi Corporation that can be used in the heat exchanger 112. Other similar components can be used in other embodiments.

Preferably the solar generator system 100 also includes a pump 132, an air motor 136, and an electric generator 140.

The pump 132 can take any form capable of forcing the working fluid through the conduit 116 at the conditions described herein. In one embodiment, the pump 132 has an outlet 142, the collector 104 has an inlet 144, and the conduit 116 extends between the outlet 142 and the inlet 144. For example, the pump 132 can be configured to increase the pressure of the working fluid in the electric power generation loop 103 to anywhere between about 80 psig and about 150 psig. In one arrangement, the pump 132 is coupled with the conduit 116 such that the output of the pump, e.g., liquid refrigerant, can be directed into the solar panel field 108. In this arrangement, the pump 132 is coupled with the plurality of heat exchangers 112 to provide incoming refrigerant under pressure to the heat exchangers.

Preferably the pump 132 is a conventional design. The pump 132 can be a stock pump. Preferably the pump 132 includes suitable seals that at least substantially prevent leaking of the fluids of the system 100. For example, some of the working fluids discussed herein can degrade seals. Thus, the material of the seal should be selected to resist such degradation. Preferably the pump 132 is capable of handling low to moderate flow and medium to high pressure. In one arrangement, the pump 132 is a rotary pump, such as a turbine pump. Preferably the pump 132 is made of materials compatible with the working fluids discussed herein and other similar working fluids. Some materials that can be used for components that interact with the working fluid include bronze, Buna-N, carbon, ceramic, Teflon, and stainless steel, e.g., type 316S stainless steel. One commercially available pump that can be used in the electric power generation loop 103 is bronze turbine pump available through Macmaster-Carr, part number 43195K15. For larger applications, the Macmaster-Carr, part number 8134K19 can work with some working fluids. Other sources of suitable pumps include MTH Pumps and Magnetix Pumps.

The solar generator system 100 preferably also includes a conduit 156 positioned between the solar panel field 108 and the air motor 136. In one embodiment, the conduit 156 is coupled with an outlet 157 of the collector 104 and with an inlet 158 of the air motor 136. The conduit 156 fluidly couples the solar panel field 108 (e.g., one or more heat exchangers 112) to the air motor 136. The conduit 156 enables heated gas from an outlet of the solar panel field 108 or from one or more of the solar heat exchangers 112 to be conveyed to the air motor 136. Preferably the conduit 156 is configured to convey heated gas that is at pressures between about 50 and about 150 psig. In some embodiments, the air motor 136 operates at relatively low inlet pressure, for example, in the range of between about 50 and about 150 psig. In other embodiments, the air motor 136 operates at an inlet pressure of about 150 psig. In some configurations, the air motor 136 operates at an inlet pressure of about 50 psig. The air motor 136 is rotated by the heated gas as the gas passes through the motor.

The air motor 136 can take any suitable form. As discussed above, the air motor 136 preferably includes one or more gas seals 168 (see FIG. 10). For example, the power rating of the air motor 136 can vary depending on the scale of the system 100 from about 1 horsepower to about 100 horsepower. In some applications, the air motor 136 can be configured with more than 100 horsepower. In one configuration, the air motor 136 includes the inlet 158 and an outlet 160. The inlet 158 is coupled with the conduit 156 such that the working fluid being conveyed in the conduit 156 can directed into the air motor 136. In one embodiment, the air motor 136 also includes a turbine (not shown) located in a fluid path between the inlet 158 and the outlet 160. In other embodiments, the air motor 136 is a piston or a vane-type air motor. A rotating portion of the air motor 136, e.g., the turbine, piston, or vane preferably is coupled mechanically with a shaft 162 that is coupled with the generator 140, as discussed below. The shaft 162 can be configured to extend to an exterior portion of the air motor 136.

Figure 10:
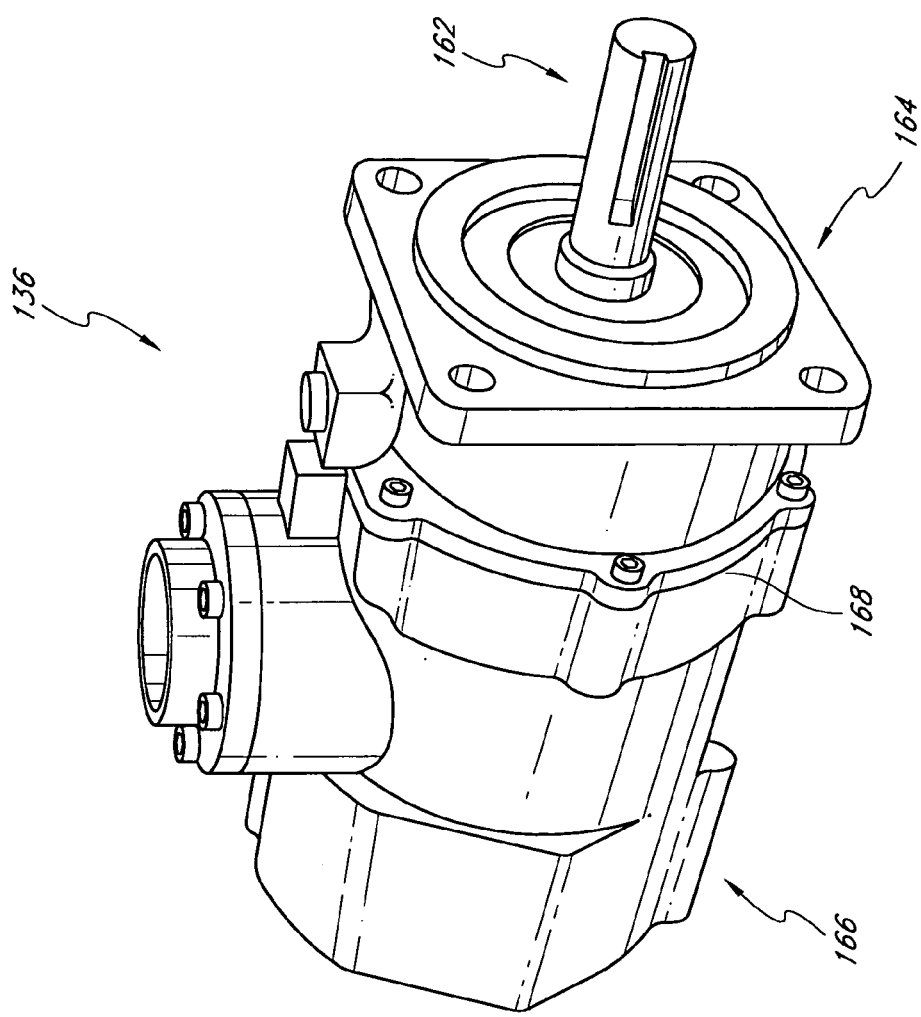
FIG. 10 is a perspective view of one embodiment of an air motor that can be used in the systems described herein.

With reference to FIG. 10, in one embodiment, the air motor 136 includes a mounting portion 164 enabling the air motor 136 to be coupled with another component, such as the generator 140. The mounting portion 164 is a flange in one embodiment. In some arrangements, a secondary mounting portion 166 is provided for mounting the air motor 136 to another object, such as a frame structure of the system 100. The secondary mounting portion 166 can include quick connect features, such as clamps, fixtures, suction cups, or conventional fasteners, for quick mounting and dismounting. Some arrangements, e.g., suction cups, comprise resilient materials that minimize vibrations transferred between the air motor 136 and other components of the system 100. Preferably resistance to rotation of the turbine and the shaft 162 is reduced by providing a bearing between one or both of these components and a housing of the air motor 136. Any suitable bearing can be used, including mechanical bearings, pneumatic bearings, and hydraulic bearing. Also, the components in contact with the working fluid preferably are made of materials that will resist corrosion because of such contact. Some such materials are discussed above in connection with the pump 132. Specific examples of air motors that can be used in connection with the systems described herein are the Tech Development Incorporated Series 51 Turbine air motor and the Ingersoll Rand SS800 Vane motor.

Preferably, the electrical generator 140 is coupled to the air motor 136 such that mechanical energy of the air motor is transferred to the generator. For example, the shaft 162 can be coupled with the generator 140 such that rotation of the shaft 162 rotates a rotor of the generator 140. The rotation of the rotor of the generator 140 can be exploited in a known manner to produce electricity. In one embodiment, the generator 140 is a stock generator. A variety of suitable generators are produced by Marathon Electric of Wausau, Wis. One model that is suitable for some applications is the Magnaplus 361PSL1600.

As discussed above, some of the components described herein, such as the air motor 136 and the pump 132 convey special fluids, such as refrigerant. In some portions of some of the systems, the fluid(s) can be under pressures different from, e.g., exceeding, the ambient pressure. For those arrangements, the components should be configured to substantially or completely contain the fluid. One technique for assuring that the fluids are at least substantially contained is to provide suitable seals at any joint in the system or point of assembly. For example, the air motor 136 will preferably includes a gas seal 168 that is configured to prevent the gas-phase working fluid in the system 100 to escape from the air motor 136. Preferably the gas seal 168 is selected from a material that does not react with and is not substantially degraded by the gas seal 168.

Preferably in one embodiment the solar generator system 100 also includes a condenser 172 to liquefy the gas exhausted from the air motor 136. In one embodiment, a conduit 176 is provided between the air motor 136 and the condenser 172. The conduit 176 can be connected to the outlet 160 of the air motor 136 and to an inlet 178 of the condenser 172. The conduit 176 provides fluid communication between the air motor 136 and the condenser 172.

The condenser 172 is configured to induce a phase change in the working fluid from a gas phase to a liquid phase. The phase change is induced by removing heat from the working fluid in the condenser 172. The condenser 172 can be configured in any suitable manner to remove sufficient heat to induce the phase change. FIG. 1 shows two variations of the condenser 172. Another option is to provide a conventional industrial evaporative cooling tower. As discussed below in connection with FIG. 2, other condenser variations are possible and can be applied to the condenser 172.

In one arrangement, the condenser 172 includes a primary fluid circuit 180 through which the working fluid flows and a secondary fluid circuit 182 configured to convey fluid that is cooler than the working fluid. The working fluid can be in gas phase at this location in the electric power generation loop 103. Removal of heat from the working fluid can be by heat transfer to a cooling fluid in the secondary fluid circuit 182. In one arrangement, cool water is pumped through the condenser 172 via the secondary fluid circuit 182 to cool. The secondary fluid circuit 182 and the cooling fluid is configured (e.g., the cooling fluid is cooled sufficiently) fully convert the working fluid from gas to liquid phase. The condenser 172 can be configured as a liquid chiller, such as any of the CH series liquid chillers sold by FlatPlate, Inc. of York, Pa.

In some implementations the water in the secondary fluid circuit 182 can be supplied to satisfy hot water needs. For example, the hot water exiting the condenser 172 can be pumped into a domestic swimming pool or used for other domestic, commercial, or industrial needs. Similarly, the water drawn into the condenser 172 can be from a swimming pool or other domestic, commercial, or industrial holding tank.

In another variation, a condenser 172' is provided that is configured to cool the working fluid by heat transfer from the working fluid to a cooling gas. One arrangement of the condenser 172' includes the primary fluid circuit 180 and apparatus for directing air over the primary fluid circuit. For example, a fan 184 can be provided to force air over the primary fluid circuit 180 of the condenser 172'. This arrangement is advantageous in that it can eliminate any conduit dedicated to the secondary fluid circuit and the liquid coolant that would otherwise need to be handled by the condenser 172' and maintained. These advantages of the gas cooled arrangement also correspondingly reduce the cost of the system 100. The gas-cooled condenser 172' is more suitable where sufficiently cool air is readily available.

Preferably the solar generator system 100 is a closed system that periodically, e.g., continuously, cycles a refrigerant or other working fluid through the system. Accordingly, in one arrangement, a conduit 192 is provided between the condenser 172 and the pump 132. Preferably, the conduit 192 is coupled with an outlet 196 of the condenser 172 and with an inlet 198 of the pump 132 such that the output of the condenser 172 can be conveyed to the pump 132 and thereafter back into the conduit 116.

In one variation of the system 100, a regenerative heat exchanger is provided. The regenerative heat exchanger is configured to preheat the working fluid upstream of the solar energy collector 104. In one arrangement, a regenerative heat exchanger heats working fluid in the conduit 116. The regenerative heat exchanger preferably directs heat from a heat source, e.g., from the gas-phase working fluid being exhausted from the air motor 136, into the liquid working fluid. In one arrangement, the regenerative heat exchanger directs heat from gas-phase working fluid in the conduit 176 into the liquid-phase working fluid in the conduit 116. Pre-heating the liquid-phase working fluid reduces the heat transfer requirements of the solar energy collector 104. This can provide additional benefits, including permitting at least one of the size and complexity of the collector 104 to be reduce. The regenerative heat exchanger also pre-cools the gas-phase working fluid downstream of the air motor 136. Pre-cooling the gas-phase working fluid reduces the cooling requirements of the condenser 172. Reduced cooling requirements permits at least one of the size and complexity of the condenser 172 to be reduce. For example, pre-cooling might permit the gas-cooled condenser or other simple arrangement to provide sufficient cooling for the system 100.

Regenerative heat exchange is one technique for increasing the efficiency of the system 100 and the other systems described herein.

Figure 1A:
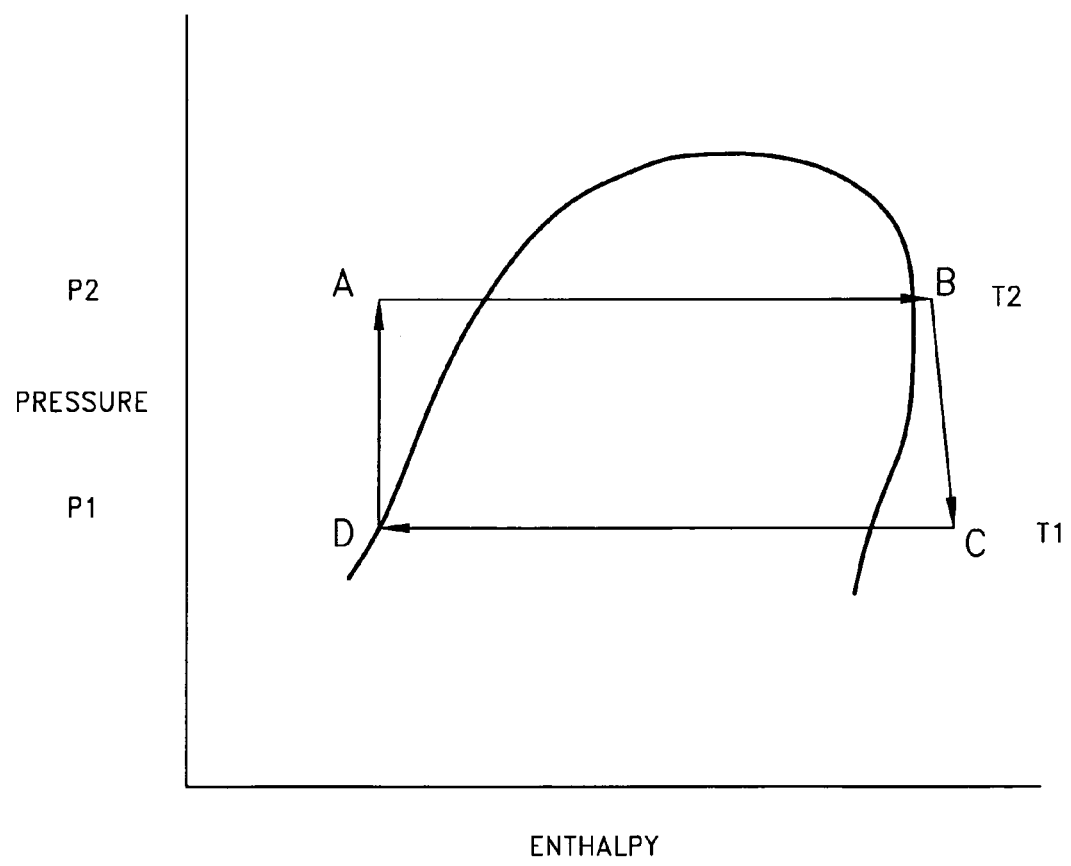
FIG. 1A is a pressure-enthalpy diagram of the operation of the system of FIG. 1.

Having described the components of the system 100, the operation of a single cycle thereof is now provided for a suitable thermodynamic cycle arrangement. The thermodynamic operations of the system are shown on FIG. 1A, as discussed further below. At a first stage of the cycle, the pump 132 in the electric power generation loop 103 pumps the working fluid from a lower pressure to a higher pressure. For example, the working fluid can be pumped from a pressure of between about 0 psig and about 50 psig to a pressure of between about 50 psig and about 150 psig. In some embodiments, the working fluid can be pumped to a pressure of between about 80 psig and about 150 psig. Preferably the fluid is pumped into the conduit 116 in liquid phase. The temperature of the working fluid prior to pump preferably is in the range of about 70° Fahrenheit (21° Celsius) to about 120° Fahrenheit (49° Celsius). The pumping process usually is substantially isothermal, though an increase of a few degrees Fahrenheit (e.g., 2° to 3°) would not be unusual. This stage is illustrated in FIG. 1A by the line connecting points "A" and "B", which diagrammatically represent liquid pumping from lower to higher pressure. The increased pressure liquid working fluid is forced via the conduit 116 through the solar energy collector 104, and in particular is forced through one or more heat exchangers 112. The solar energy collector 104 collects sufficient solar energy flux and transfers heat therefrom to the liquid working fluid to transform the working fluid from liquid to gas phase. This transformation is illustrated diagrammatically in FIG. 1A as the line connecting points "B" and "C". As discussed herein, the phase change is driven by heat transfer from one or more solar cells. In some cases, the heat is transferred to the working fluid by a heating fluid that absorbs heat in the solar cell such that the temperature of the heating fluid is in the range of 160 to 200 degrees Fahrenheit (71° to 93° Celsius). As discussed herein, in some implementations, at least a portion of this transformation is completed by a secondary heat energy source, e.g., with systems that employ dual heating.

The gas-phase working fluid is forced via the conduit 156 through and expands in the air motor 136. Movement and expansion of the gas-phase working fluid in the motor rotates the motor, e.g., a turbine, piston, or vane housed therein. Rotation of the turbine is transferred by the shaft 162 to a rotor in the generator 140. The generator 140 is configured such that rotation of the rotor induces an electrical current to flow, whereby electrical power is generated. Work is thereby performed by the system. At least one of the pressure and temperature of the gas-phase working fluid drop as this work is being performed in the air motor 136. FIG. 1A illustrates that both pressure and temperature drop as work is being performed, as illustrated by the line connection the point "C" with a point "D".

The air motor 136 exhausts the working fluid through the outlet 160 in gas phase at a lower pressure. The gas can be exhausted at a pressure between about 10 psig and about 60 psig. In some embodiments, the exhaust gas is at a pressure between about 20 psig and about 50 psig. The exhaust of the air motor 136 is directed via the conduit 176 through the condenser 172 wherein the working fluid is liquefied by heat rejection cooling, as discussed above. The rejected heat may be recovered for other uses, such as for providing hot water for domestic use. This cooling phase of the operation of the system is illustrated in FIG. 1A diagrammatically by a line connection the points "D" and "A". The cooled, lower pressure liquid working fluid is then returned to the inlet 198 of the pump 132 via the conduit 192 to repeat the cycle to produce more electrical power.

Among the advantages of the systems described herein is the comparatively low temperatures and pressures of the thermodynamic cycles. These pressures are much lower than those found in other solar thermal applications. This is one of the features of the systems described herein that enables stock components to be used. The use of stock components enables the systems described herein to be more economically produced and operated to provide an economically viable renewable source of electricity.

B. Indirect Heating of a Working Fluid with Solar Energy Flux

Figure 2:
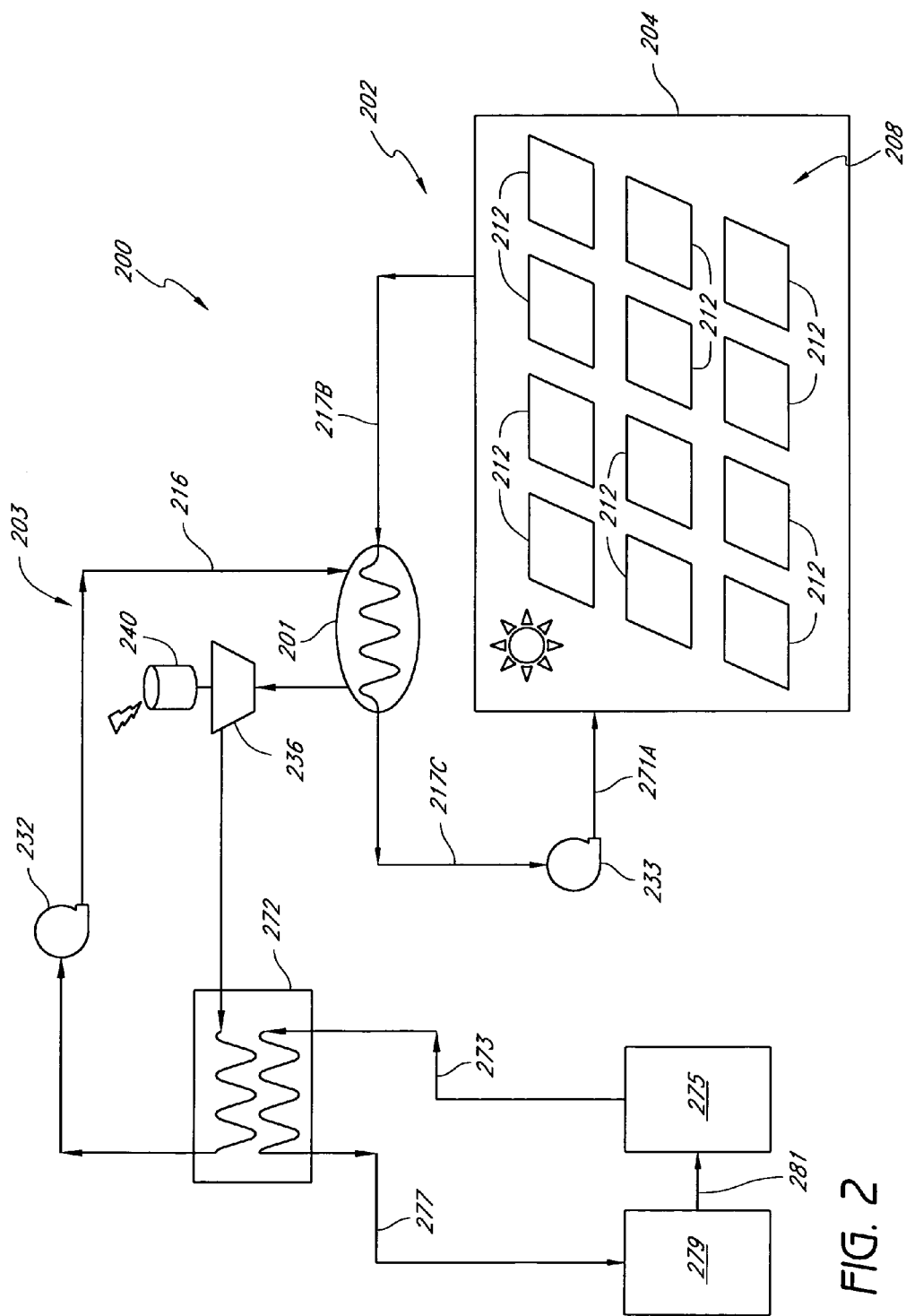
FIG. 2 is a schematic diagram of another embodiment of a solar generator system similar to that of FIG. 1, including a heat sink and a condenser exploiting passive cooling of a cooling fluid.

FIG. 2 shows another embodiment of an economical solar generator system 200 that is configured for expand hours of usage by including a heat sink 201. The heat sink 201 is configured to store collected solar energy. In one embodiment, the heat sink 201 can store heated water at an elevated temperature, e.g., in the range of about 190° Fahrenheit (88° Celsius) to about 205° Fahrenheit (96° Celsius). As discussed further below, the heat sink 201 provides a variety of advantages, including enabling the system 200 to operate for a longer period compared to a system without the heat sink 201. The solar generator system 200 is in other ways similar to the system 100, except as described herein. The descriptions of the components of the system 100 and of the variations thereof also apply to the system 200 and variation thereof.

The system 200 uses two loops to convert solar energy into electrical power. A first loop 202 heats a heat storage fluid, which can be a liquid such as water. The heat storage fluid, which is sometimes referred to herein as a hating fluid, can include at least one of water, a water-based mixture or solution, an anti-corrosion agent, ethylene glycol, and high temperature fluids, which are fluids that can remain in liquid form at temperatures above the boiling point of water. High temperature fluids include certain oils and Dowtherm®, which is one form of diphenyl oxide biphenyl. Some suitable high temperature fluids remain in liquid form up to about 260° F. The first loop 202 is sometimes referred to herein as a "heating loop." A second loop 203 of the system 200 produced electrical power, and is sometimes referred to herein as an "electric power generation loop." A second loop 203 can also be referred to as a working fluid loop. The heat sink 201 interacts with the second loop 203, as discussed below. The second loop 203 is similar to the electric power generation loop 103, except as described herein.

With continued reference to FIG. 2, the heating loop 202 can include a solar energy collector 204 that includes a solar panel field 208. The solar panel field 208 can include stock solar heat exchangers 212 of the kind used as condensers in automotive air conditioners or as radiators in engines, or any other suitable heat exchanger. A pump 233 can be provided to force the heat storage fluid through the solar panel(s). One or more conduits are provided between the pump 233, the solar energy collector 204, and the heat sink 201. In one embodiment, a conduit 217A provides fluid communication between an outlet of the pump 233 and an inlet of the solar energy collector 204, a conduit 217B provides fluid communication between an outlet of the solar energy collector 204 and an inlet of the heat sink 201, and a conduit 217C provides fluid communication between an outlet of the heat sink 201 and an inlet of the pump 233.

In one arrangement, the direction of flow of the heat storage fluid in the heating loop 202 is indicated by the arrowheads at the ends of the schematic representation of the conduits 217A, 217B, and 217C. However, the heat storage fluid can flow in the opposite direction, for example, if another device or mechanism is provided for directing the heat storage fluid to the solar energy collector 204 from the heat sink 201, for example, another pump, gravity, or other suitable apparatus.

The heat sink 201 can take any suitable form. For example, the heat sink 201 can include a large container, e.g., a flexible bladder, for holding the heat storage fluid. In some applications, environments, and embodiments, the heat sink 201 is insulated to minimize heat transfer from the heat storage fluid, through the heat sink 201. In one arrangement, water is heated to between a temperature between about 180° to about 205° Fahrenheit (82° to 96° Celsius) for heat storage in the heat sink 201. If the heat storage fluid is a liquid under normal operating conditions of the system 200, the heat storage fluid can be heated to a temperature up to but not exceeding the boiling point of the fluid, e.g., 210° Fahrenheit (99° Celsius) for water.

Figure 2A:
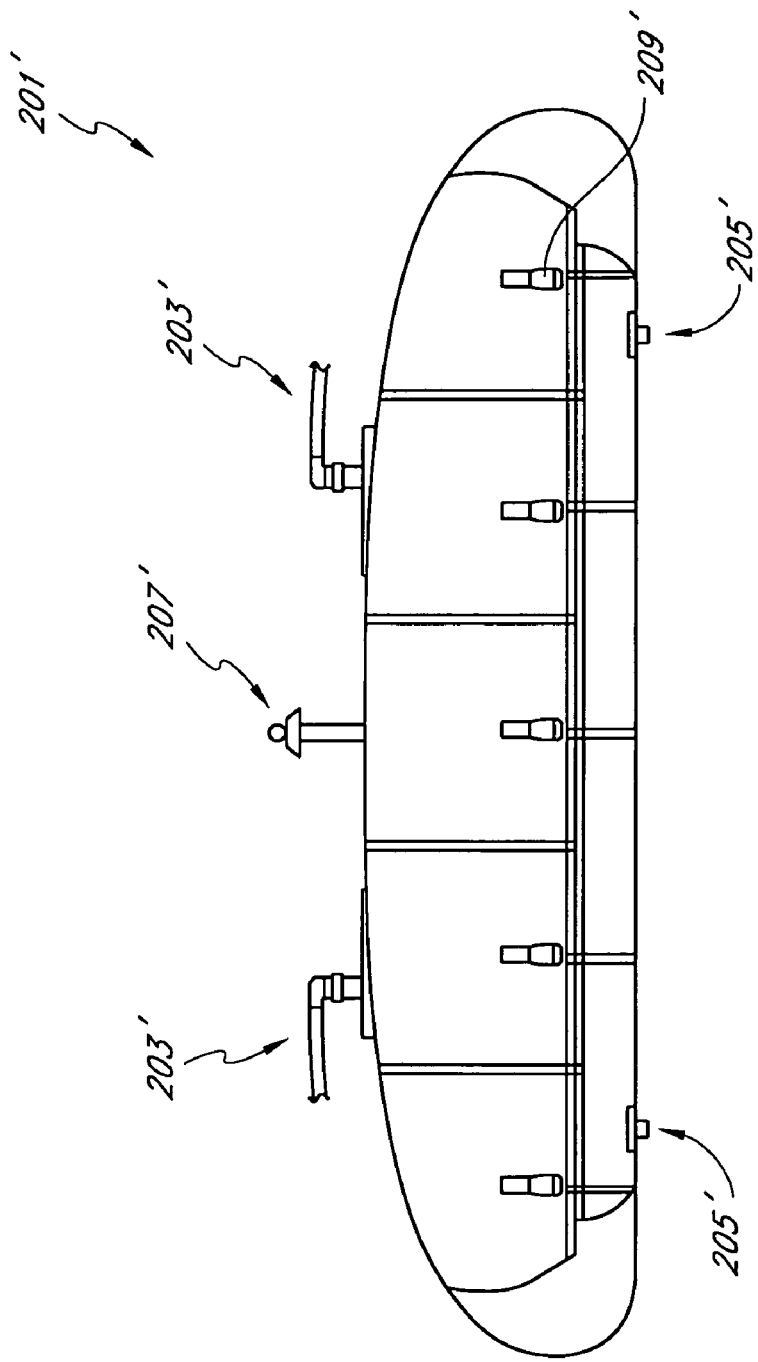
FIG. 2A is a schematic diagram of one embodiment of a heat sink capable of being used in the system of FIG. 2.

FIG. 2A illustrates more details of one embodiment of a heat sink 201'. In one arrangement, the heat sink 201' is configured as a soft shell water tank that can store a large amount of cooling fluid. In some arrangements, the heat sink 201' is capable of storing up to 20,000 gallons (76,000 liters) or more. In having a soft shell construction, the heat sink 201' preferably has an increased external size when filled. In one embodiment, the heat sink 201' has a width of more than about 20 feet (6 meters), e.g., 23 feet (7 meters), and a height of about 5 feet (1.5 meters) or more when filled. The length of the heat sink 201' can be selected to provide sufficient fluid and heat storage capacity for the systems described herein. Of course, depending on the scale of the system, the width and height dimensions can also be scaled up or down. MPC Containment produces a Pillow Tank product that can be suitable for some systems described herein.

The heat sink preferably also has at least one inlet 203' and at least one outlet 205'. The inlets and outlets 203', 205' can be configured to couple with hoses or other conduits of suitable size, e.g., having a diameter of up to four inches (10 centimeters) or more. In the illustrated embodiment, the heat sink 201' has a plurality of (e.g., two) inputs and outputs. In some arrangements, a vent 207' is provided is permit air in the heat sink 201' to escape. In some applications, it may be desirable to anchor the heat sink 201' to a support structure or to the ground. Accordingly, anchor members 209' can be provided to which cables or other tethering devices can be attached. The heat sink 201' can also be configured as a rigid structure rather than a flexible bladder, maintaining its shape when not filled.

Referring again to FIG. 2, the electric power generation loop 203 includes a pump 232 for directing a working fluid into communication with the heat sink 201. The heat sink 201 stores heat gathered by the solar energy collector 204, as discussed above, and preferably is a source of heat sufficient to increase the temperature of the working fluid in a manner similar to that of the loop 103. Preferably, the heat sink 201 stores sufficient heat to change the phase of the working fluid from liquid to gas. In one arrangement, a conduit 216 conveys the working fluid from the pump 232 toward the heat sink 201. In one embodiment, at least a portion of the conduit 216 is positioned adjacent the heat storage fluid. In one embodiment, the conduit 216 is routed through an internal portion of the heat sink 201. In other embodiments, the conduit 216 is in contact with a portion of the heat sink 201, e.g., an external surface thereof, to increase heat transfer by conduction.

The arrangement of FIG. 2 provides indirect heating of the working fluid. The arrangement of FIG. 2 enables the working fluid to be converted from a liquid to a gas phase without requiring the working fluid to flow through the solar energy collector 204. In this arrangement, indirect heating of the working fluid is by at least one mode of heat transfer (e.g., at least one of conduction, radiation, and convection) from the heat storage fluid, the heat sink 201, or another portion of the heating loop 203 to the working fluid. The heat transferred to the working fluid is sufficient to transform the phase of the fluid to gas phase, which is used to drive an air motor 236, as discussed above.

FIG. 2 illustrates one embodiment of a condenser 272 that can be used in the solar generator system 200 and in any of the other systems disclosed herein. The condenser 272 is similar to the condenser 172 except as described herein. The condenser 272 is configured to extract heat from the working fluid being exhausted from the air motor 236. The condenser 272 uses a passive cooling technique to minimize the energy needed to remove the heat from the working fluid. Such energy is "parasitic" in that it reduces the net energy out of the system making the system less effective. In one arrangement, a cooling fluid, e.g., water or another liquid or fluid, is directed through a conduit 273 from a cool storage tank 275 to a location proximate the working fluid whereby heat is transferred from the working fluid to the cooling fluid. Thereafter, the cooling fluid is directed through a conduit 277 away from the working fluid and is stored in a manner that encourages passive heat removal from the cooling fluid.

In one embodiment, a conduit directs the cooling fluid back into the cool storage tank 275 where heat is removed passively from cooling fluid in the tank. Removal of heat from the cooling fluid in the cool storage tank 275 can be achieved by any suitable technique, such as by radiation heat transfer from the cool storage tank 275 to the atmosphere. Radiation can be combined with one or more additional modes of heat transfer, such as enhanced convection with the ambient air.

In another variation, the cool storage tank 275 is a first storage tank and a second, hot storage tank 279 is positioned between the conduit 277 and the cool storage tank 275. The hot storage tank 279 can temporarily store the cooling fluid after the fluid has been used to remove heat from the working fluid. The cooling fluid, having absorbed heat from the working fluid in the condenser 272, can be held in the hot storage tank 279 until it reaches a sufficiently low temperature for further circulation through the condenser 272 and then transferred to the cool storage tank 275 until needed. The cooling fluid can be transferred between the tanks 275, 279 by a conduit 281, which can be external to the tanks, as shown.

The amount of cooling fluid and the size and configuration of the tank(s) 275, 279 can be selected such that the cooling fluid is cooled sufficiently during one overnight period. For example, in one application about 50,000 gallons of cool water at 65–70° Fahrenheit can be delivered to the condenser 272 to cool the working fluid. The water would exit the condenser at an elevated temperature, e.g., in the range of about 90–95° Fahrenheit. As discussed further below in connection with FIG. 9, the water can be cooled at night by conduction with the ground, convention with the cool night air, and radiation with space on a clear night. Also, as discussed further below, a circulating pump can be used to enhance cooling in the tanks 275, 279. Or, the circulating pump can be used to decrease the amount of cooling water needed in the system 200. Other techniques are provided for cooling in the condenser 272. But, these generally are more costly than shown with the condenser 272 and in FIG. 9. Additional details of the passive cooling system of FIG. 2 are discussed below in connection with FIG. 9.

The economical solar generator system 200 can be modified, such as providing any of the other condenser arrangements discussed herein.

As discussed above in connection with the system of FIG. 1, the solar generator system 200 can be configured with a regenerative heat exchanger, e.g., to increase the efficiency of the system. Also, the solar generator system 200 can be configured to heat water for domestic use or provide other economic benefit.

C. Electrical Power Generation System with a Plurality of Energy Sources

The electrical power generation systems described herein can be configured to heat a working fluid by collecting solar energy flux from the sun. In some arrangements, the working fluid is heated only by solar energy flux from the sun. In other systems, solar energy flux from the sun is a first or primary energy source and a secondary energy source is provided to enhance the heating of a fluid. It is preferred that the primary energy source be a renewable source, such as solar energy flux. However, in some applications, the primary energy source can be heat from another process, e.g., waste industrial heat. A secondary energy source can be deployed in a heating loop to heat a heat storage fluid or in an electrical power generation loop to heat a working fluid, as discussed further below.

1. Systems with a Secondary Energy Source for Heating a Heat Storage Fluid

Figure 3:
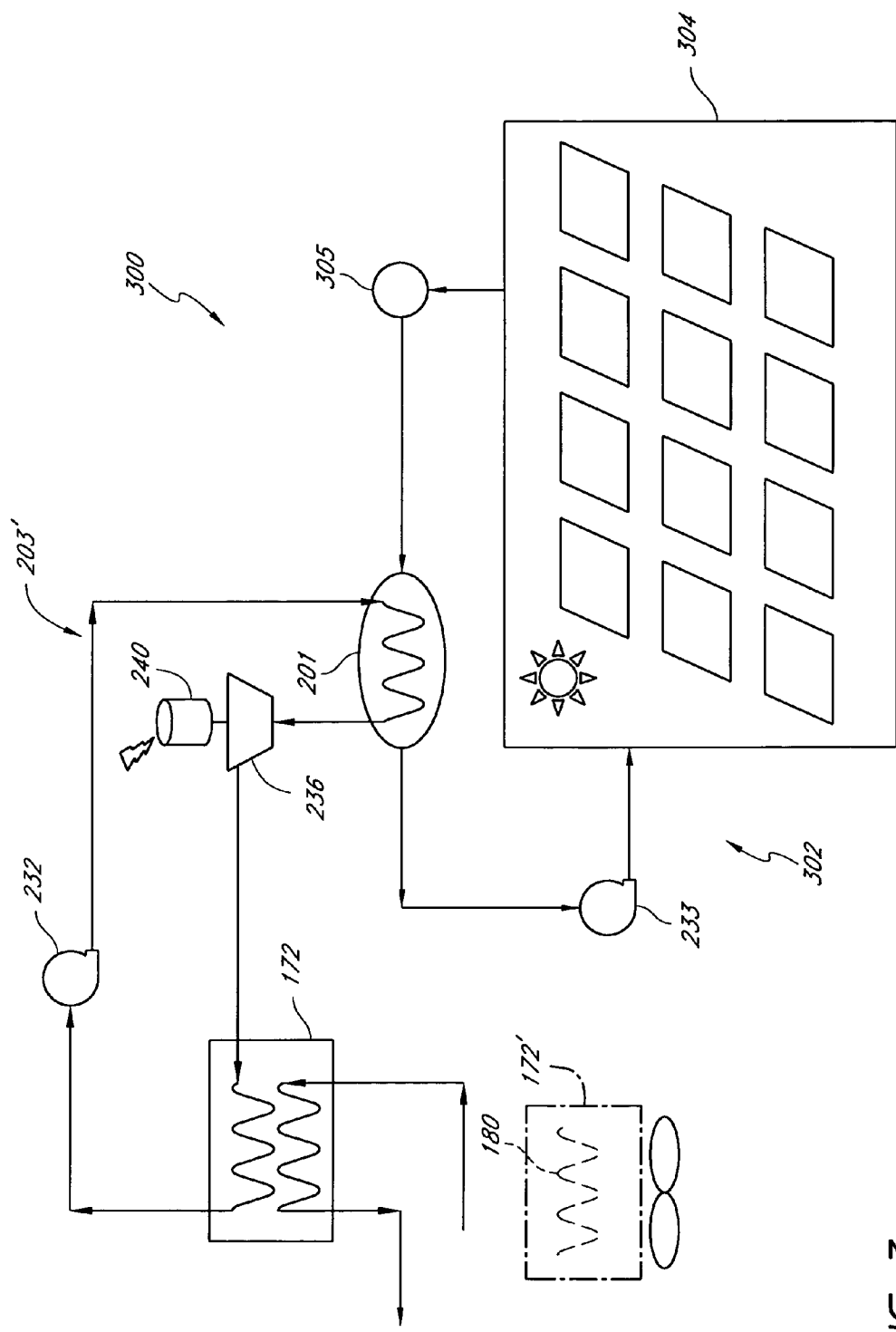
FIG. 3 is a schematic diagram of another embodiment of a solar generator system similar to that of FIG. 2, using a renewable energy source as a first energy source, including a secondary energy source.

FIG. 3 shows another embodiment of an economical solar generator system 300 that includes a plurality of heat energy sources. The system 300 is similar to the system 200, and some of the like components are given the same reference numbers. The system 300 includes a heating loop 302 and an electric power generation loop 203'. The heating loop 302 includes a heat sink 201 and a solar energy collector 204. The electric power generation loop 203' is similar to the loop 203 except that the condenser 172 or the condenser 172' are preferred. However, as discussed above other condenser arrangements are also possible, including the condenser 272.

In one embodiment, a secondary heat energy source 305 is provided in the heating loop 302. The secondary heat energy source 305 can be a gas or electric fired liquid heater. Preferably the secondary heat energy source 305 is a stock component, such as a stock water heater, keeping the cost of the system low.

The secondary heat energy source 305 provides several advantages to the system 300. For example, the secondary heat energy source 305 enables the system 300 to add heat to the heat storage fluid, and thereby to the heat sink 201. One advantage of providing secondary heat energy source 305 is that the system 300 can continue to operate when there is insufficient solar energy flux to adequately heat the working fluid in the power generation loop 203'. Insufficient solar energy flux can occur on cloudy days, or when the sun is generally lower in the sky or the days are shorter, e.g., during the winter months.

In some applications, the system 300 relies primarily or exclusively on the solar energy collector 304 to heat the heat storage fluid when there is sufficient solar energy flux. For example, on a sunny day incident sunlight may be strong enough to provide sufficient heat to operate the electric power generation loop 203'. In some applications or modes of operation, the system 300 relies in part on solar energy flux and in part on heat from the secondary heat energy source 305 to heat the heat storage fluid. This mode, sometimes referred to herein as "dual heating", can draw any percentage of the total heat input from solar energy flux and from the secondary heat source 305. For example, at midday on a sunny day, the amount of heat drawn from the secondary heat source 305 can be less than 50 percent of the total heat. In some cases, the amount of heat drawn from the secondary heat source 305 can be anywhere between about 25 and about 50 percent of the total heat input. In other cases, the amount of heat from the secondary heat source 305 can be anywhere between about 5 and about 25 percent or less of the total heat input. Some applications permit the system 300 to operate with less than 5 percent of the total heat being contributed by the secondary heat source 305.

In other modes, dual heating shifts the percentage of contribution of the total heat input from the secondary heat source 305 throughout the day. For example, between sunrise and the peak of solar energy flux, the amount of heat from the heat source 305 can be reduced. In one mode, the percentage of contribution from the secondary heat source 305 is steadily, e.g., continuously, reduced from after sunrise until peak solar flux. Similarly, between the peak of solar energy flux and sunset, the amount of heat from the heat source 305 can be increased. In one mode, the percentage of contribution from the secondary heat source 305 is steadily, e.g., continuously, increased from after peak solar flux until the system is stops operating (e.g., at sunset).

Various control schemes for varying the percentage of the total heat input contributed by the secondary heat source 305 can be deployed by the use of a controller or simple computer. The controller or computer preferably is on-site, e.g., incorporated into the secondary heat source 305. However, in some applications, the controller can be remote from the system 300, communicating with the system over a communication network. In some arrangements, a control scheme based on one or more variables are used. The variables can predictable factors such as time of the day and the day of the year. The variables also can include measurable variables, such as one or more measurements of the temperature of the heat storage fluid or the working fluid. For example, a measurement of the temperature of the heat storage fluid at an exit of the solar energy collector 304 can signal the controller to cause the secondary heat energy source 305 to begin to add heat to or increase the percentage of heat contribution to the system 300. In another variation, the measurement can be made at or in the heat sink 201. More than one measurement of heat storage fluid temperature, of working fluid temperature, or of a combination of heat storage fluid and working fluid temperatures can be used as variables in various control schemes. In some techniques, measured solar energy flux can be used alone or in combination with one or more other variables, measured or predictable, in other control schemes.

As with the systems described above, the solar generator system 300 can employ a regenerative heat exchanger to increase the efficiency of the system. In some variations, the system 300 can be configured to provide hot water for domestic or other uses or can be configured to provide economic benefits in addition to electrical power generation. Also, any of the condenser arrangements or other component variations described herein can be deployed in the system 300.

2. Systems with a Secondary Energy Source for Heating a Working Fluid

Figure 4:
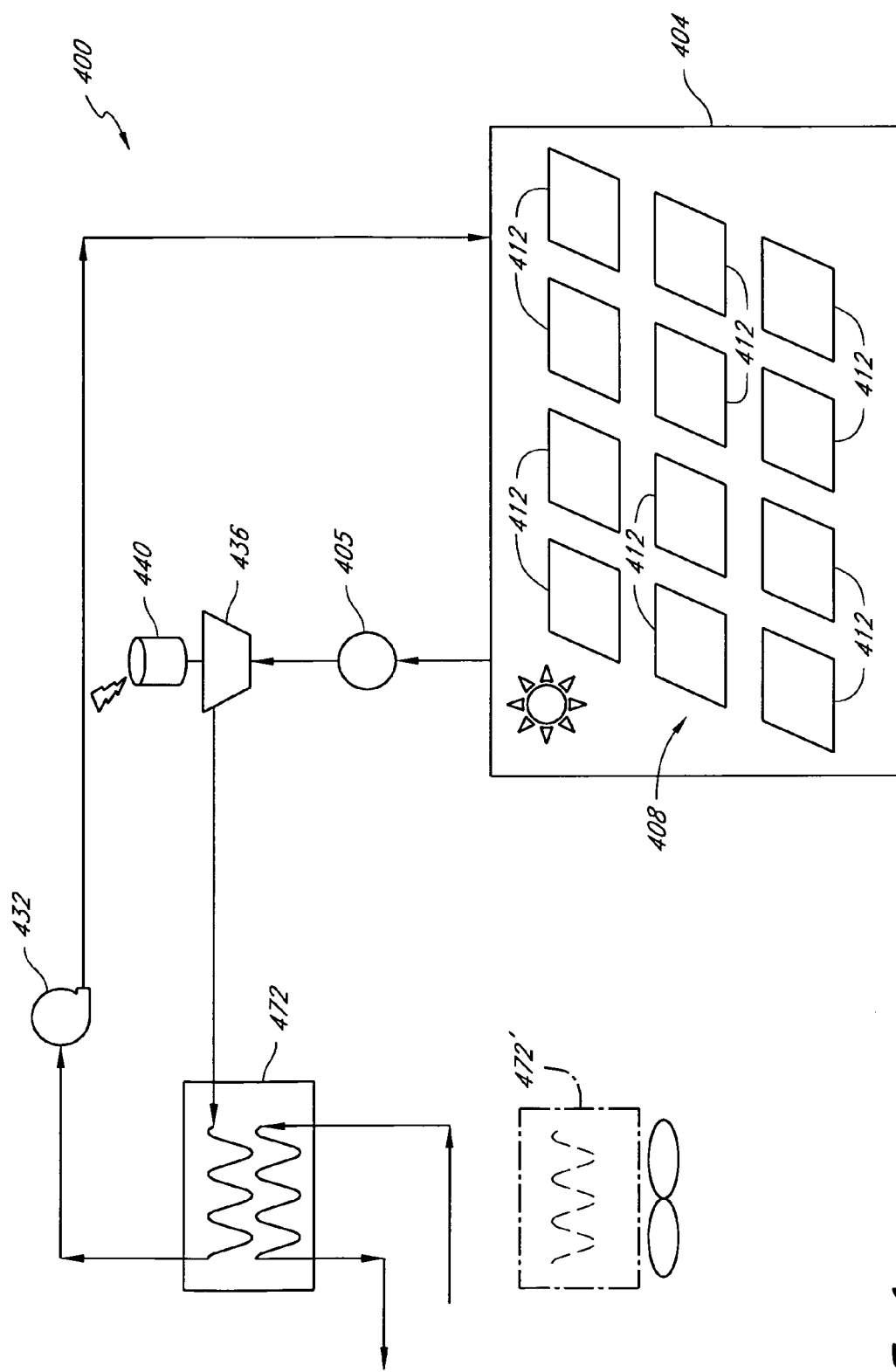
FIG. 4 is a schematic diagram of another embodiment of a solar generator system similar to that of FIG. 1, using a renewable energy source as a first energy source, including a secondary energy source.

FIG. 4 illustrates an economical solar generator system 400 that includes a plurality of heat energy sources for heating a working fluid. As discussed further below, the system 400 can include water as a working fluid and water vapor, e.g., steam, to drive an air motor 436.

In one arrangement, water is heated by a solar energy collector 404. The water can be forced through the collector 404 by a pump 432. The solar energy collector 404 can take any suitable form, in one embodiment the collector 404 is configured as a solar panel field 408. The solar panel field 408 includes a plurality of solar heat exchangers 412 in one arrangement. The solar panel field 408 can be constructed as an array of solar heat exchangers 412 or as with a unitary construction. Preferably the solar heat exchangers 412 are low cost, stock heat exchangers similar to those discussed above. The solar energy collector 404 preferably is configured to be able to elevate the temperature of the water, e.g., to a temperature in the range of about 180 degrees Fahrenheit to about 205 degrees Fahrenheit or almost as high as the boiling point, e.g., 210 degrees. In higher temperature environments, a high temperature working fluid, such as Dowtherm®, may be suitable. The high temperature fluid is beneficial in that it enables a greater temperature rise in the higher temperature environment without boiling. In some embodiments, a gas-phase heat exchanger could be used to transfer heat from the heating fluid in gas phase to the working fluid, though such arrangements involve more expensive components capable of containing the gas-phase heating fluid. In some arrangements or operational modes of the system 400, the water can be heated to a temperature below 180° Fahrenheit (82° Celsius).

In one embodiment, the solar energy collector 404 is a primary heat energy source and the system 400 includes a secondary heat energy source 405. As discussed above, the primary heat energy source can be another renewable energy source other than solar energy flux. In some applications, the primary energy source is not a renewable energy source, but is heat from another process, e.g., waste industrial heat or heat from a biomass process. The secondary heat energy source can be similar to the secondary heat energy source 305, except as set forth below.

In one arrangement, the working fluid of the system 400 is water and the secondary heat energy source 405 is a water heater, e.g., a boiler. Preferably the secondary heat energy source 405 is a stock component, e.g., a stock boiler. The secondary heat energy source 405 is configured to produce steam from water or, more generally, to convert or more completely convert the working fluid from liquid to gas phase. The secondary heat energy source 405 can be configured to heat any of the other liquids discussed herein, particularly those described as being usable as a heat storage fluid. The secondary heat energy source 405 can be powered by electricity or can be gas fired. Preferably the gas-phase working fluid exits the secondary heat source 405 as a relatively high pressure steam. The gas-phase working fluid of the system 400 drives the air motor 436 and accordingly also drives a turbine 440 associated therewith.

The system 400 includes a condenser 472 similar to the condenser 172. FIG. 4 shows that a condenser 472' similar to the condenser 172' can also be used. The other condenser variations discussed herein also can be used, e.g., the condenser 272.

The system 400 can be controlled in a manner similar to that discussed above in connection with the system 300, e.g., by varying the percentage contribution of the secondary heat energy source 405 depending one or more of the time of day, the season, the weather conditions, inputs from sensors, and other factors.

Also, the systems 300 and 400 have conduits that are similar to those shown in FIGS. 1 and 2, with the direction flow indicated by the arrowheads. As discussed above, the components can be rearranged in some embodiments. For example, the working fluid in the system 400 can be preheated before being directed into the solar energy collector 404. This can be achieved by moving the secondary heat energy source 405 upstream of the solar energy collector 404. Also, not all of the components of the systems described herein are required in all variations. For example, the pump 432 can be replaced by another mode of pressurizing the working fluid, e.g., potential energy.

Also, many of the features of the systems can be interchanged. For example, in some applications it may be beneficial to provide both preheating of a fluid, as described in connection with the system 300, and post-heating of a fluid, as described in connection with the system 400. Where both pre- and post-heating capabilities are combined in a system, these components can be controlled to operate at select times during the cycle or depending on the environmental conditions as measured or predicted.

D. Systems Including a Parallel Flow Solar Panel Field

FIG. 5 shows that in some embodiments, the flow though a solar panel field is at least partly parallel flow.

FIG. 5 shows an economical solar generator system 500 that is similar to the system 300, except as described herein. The system 500 includes a heating loop 502 and an electric power generation loop 503.

As discussed above in connection with the system 300, the heating loop 502 is configured to collect solar energy flux to collect heat to be used to vaporize a working fluid in the power generation loop 503. In the variation of FIG. 5, the heating loop 502 includes a solar energy collector 504 that collects the solar energy flux. The collector 504 comprises a solar panel field 508 and a heat storage tank 510. The heat storage tank 510 can be a hot water storage tank. Preferably a stock hot water storage tank is used that is capable of handling some amount of surge in the system 500. The solar panel field 508 preferably includes a plurality of solar heat exchangers 512 that are configured in a suitable manner. In one embodiment a conduit 514 is configured to provide a flow of a heat storage fluid, which can be cool water. The conduit 514 can include a plurality of inflow lines 514A that each have a plurality of branches 514B. Each of the branches 514B preferably is coupled with an inlet of a solar heat exchanger 512. The solar panel field 508 also preferably includes a conduit 516 that extends between the heat exchangers and the heat storage tank 510. The conduit 516 can include a plurality of outflow lines 516A that each has a plurality of branches 516B. Each of the branches 516B preferably is coupled with an outlet of a solar heat exchanger 512. Flow in the conduit 516 is from the solar panel field 508 to the heat storage tank 510.

The solar panel field 508 is configured with the solar heat exchangers 512 in a parallel fluid flow arrangement. In other words, fluid flows through less than all of the solar heat exchangers 512 in the solar panel field 508. In the illustrated embodiment, only a single solar heat exchanger 512 is provided between the branch 514B of the inflow conduit and the branch 516B of the outflow conduit. In other arrangements, at least some serial flow is provided. The solar panel field 508 can be configured such that a plurality of panels is provided between the branch 514B of the inflow conduit and the branch 516B of the outflow, such that both serial and parallel flow are provided.

The solar heat exchangers 512 can be configured in any suitable orientation. In one preferred embodiment, the solar heat exchangers 512 are oriented relative to the sun to collect the greatest amount of solar flux through the day and throughout the year. This orientation will vary depending on the location of the site. For example, as illustrated in FIG. 5, the solar heat exchangers 512 can be positioned to face generally south in located in the northern hemisphere. Also, the solar heat exchangers 512 can be tilted back relative to a vertical plane so that they face upward somewhat. The angle of inclination of the solar heat exchangers 512 also is related to the location of the system 500. For example, the further the installation of the system 500 is from the equator, the smaller angle is between the vertical plane and the solar heat exchangers 512. Also, the closer the installation of the system 500 is to the equator, the larger is the angle between the vertical plane and the solar heat exchangers 512.

Once the appropriate orientation and inclination of the heat exchanger is determined, a suitable support structure can be provided to support the solar heat exchanger 512. A number of variations of support structures are discussed below in connection with FIG. 6.

Any number of solar heat exchangers 512 can be provided to collect the amount of heat needed to run the system 500. In some applications, the amount of heat collected is limited by the amount of space available. For example, one implementation of the system 500 provides up to about 300 heat exchangers per one-half acre of space.

The flow of the heat storage fluid into the conduits 514 can be provided in any suitable manner. In one embodiment, the heating loop 502 includes a pump 520 that feeds the heat storage fluid, which can water or water glycol mixture, to solar panel field 508 for solar heating in the solar heat exchangers 512. The pump 520 can take any suitable form, including any of the pumps discussed herein.

As discussed above, the system 500 also includes an electric power generation loop 503. In some variations of the system 500, the power generation loop 503 includes a secondary heat energy source 505. The secondary heat energy source can take any suitable form, e.g., including a natural gas, propane, or electric commercial in-line "topping heater." As discussed above, the secondary heat energy source 505 is advantageous for use in lower solar flux conditions, and varying site conditions. The secondary heat energy source 505 can be sized to accommodate any site condition. The secondary heat energy source 505 can be sized large enough to run as stand alone gas fired thermodynamic cycle without heat input from the solar panel field 508.

The secondary heat energy source 505 can be combined with a thermostatic valve 506 and/or programmable logic controls to optimize usage. The valve 506 provides a flow path around the secondary heat energy source 505. The secondary energy 505 source can include any of the features discussed above in connection with the secondary heat energy source 405. For example, the secondary heat energy source 505 can be a liquid heater, e.g., a water heater. The secondary energy source 505 can be configured to convert the fluid therein from liquid to gas, e.g., the source 505 can be a boiler. As discussed above, the secondary heat energy source 505 can be a stock component.

The system 500 includes a heat exchanger 524 that is between the heating loop 502 and the electric power generation loop 503. In various embodiments, the heat exchanger 524 includes at least one of a flooded evaporator heat exchanger, a flat plate heat exchanger, a shell and tube multi-pass type heat exchanger, or a tank immersion heat exchanger. The heat exchanger 524 transfers heat in the heat storage fluid of the heating loop 502 to the working fluid of the electric power generation loop 503. Preferably sufficient heat is transferred from to the working fluid to convert the working fluid from liquid phase to gas phase.

The electric power generation loop 503 also includes a pump 532 and an air motor 536. The air motor 536 has suitable gas seals so that substantially all incoming high pressure working fluid gas performs work. The outlet of the air motor 536 is a low pressure, near saturated gas. The air motor 536 can take any of the forms described above, including turbine, vane or piston type, or other suitable arrangement, depending on size and site conditions. The pump can take any suitable form, such as a multi-stage high head turbine pump, for pumping the working fluid. Preferably the pump 532 has suitable seals that are compatible with the working fluid and the conditions of operation of the electric power generation loop 503.

The electric power generation loop 503 also includes an electric generator 540 and a condenser 572. The electric generator 540 can take any suitable. In one implementation, the electric generator 540 is a 3 phase 480 volt induction generator. The air motor 540 can be directly coupled with or flange mounted to (e.g., via a gear-case) the air motor 536.

The condenser 572 can take any suitable form such as the discussed above and can be configured as a shell and tube or a compact flat plate heat exchanger condenser. The condenser 572 can be water-cooled, to condense the working fluid, which can be refrigerant, as discussed above.

Other components that can be included are a cooling fluid pump 574 to feed water from cooling source into the condenser 572. In one arrangement a return conduit 575 is coupled with the condenser 572 and coveys cooling fluid at an elevated temperature back to the structure or structures that remove heat from (or enable removal of heat from) the cooling fluid. As discussed herein, such structures can include storage tanks that enable nighttime cooling, as discussed further below in connection with FIG. 5, an evaporative cooling tower, a conventional air cooler, or other suitable apparatus or mechanism. Further features that can be added to the system 500 include one or more check valves 577 to provide one-way flow through at least one of the heating loop 502 and an electric power generation loop 503.

Also, the output of the air motor 536 can be controlled in a suitable fashion in some applications. For example, a diffuser type discharge pipe 579 can be provided downstream of at least a portion of the air motor 536. Preferably the diffuser type discharge pipe 579 has diverging cross sectional area. In some embodiments, one or more control valves 581 are provided to regulate flow. For example, a control valve 581 can be provided downstream of the air motor to regulate the exhaust temperature and pressure of the air motor.

As with the other embodiments discussed herein, the system 500 can be augmented with one or more features of any of the other systems described herein.

E. Components for Use in Economical Solar Thermal Systems

Various components of the systems described above are further described below or can be substituted with the components described below.

Figure 6:
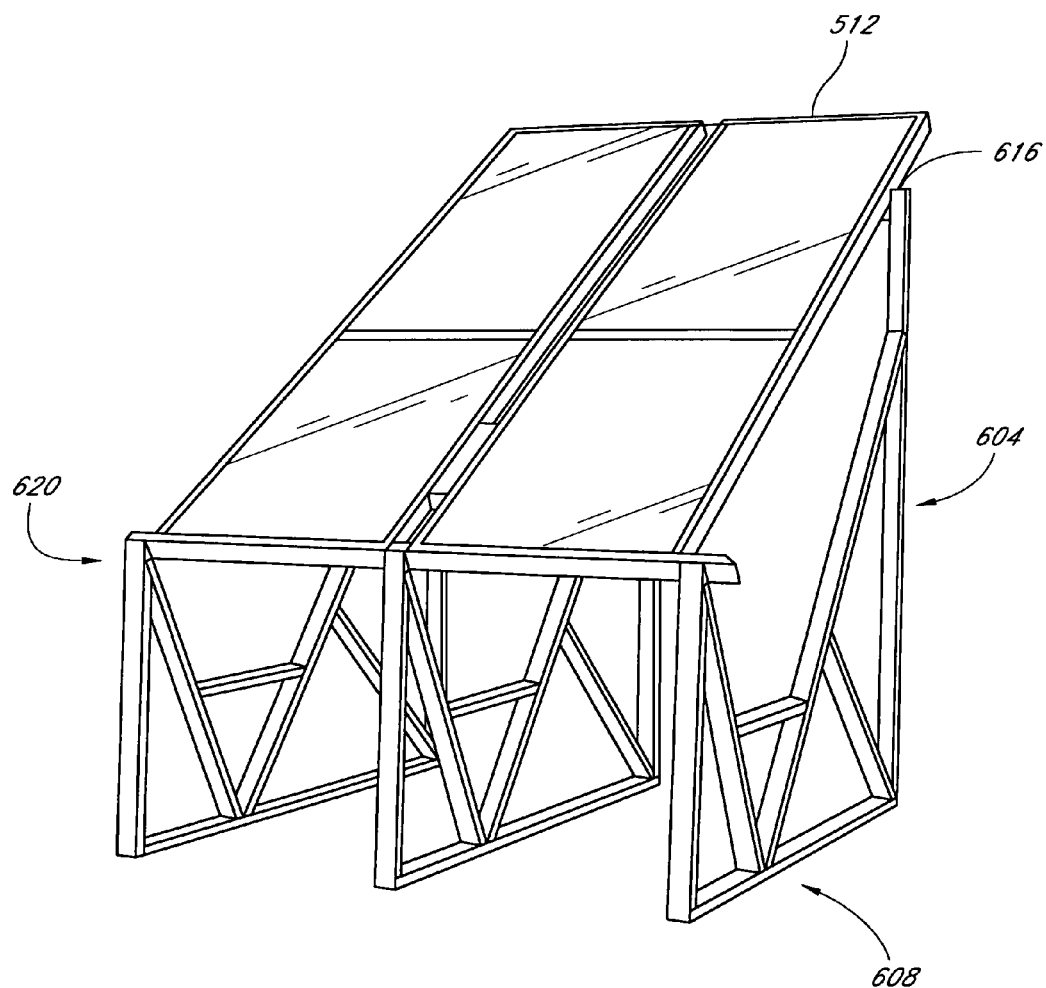
FIG. 6 is a perspective view of one configuration of a heat exchanger support stand.

FIG. 6 illustrates in further detail a portion of the solar panel field 508. In particular, two solar heat exchangers 512 are shown mounted on a support stand 604. The support stand 604 comprises a frame having a base portion 608 to be placed on a terrestrial structure, such as the ground, a roof-top, or another support structure. The support stand 604 also comprises a heat exchanger support 612 to support the solar heat exchanger 512. The heat exchanger support 612 preferably includes an upper end 616 and a lower end 620. The position of the upper and lower ends 616, 620 and the length of the base portion 608 are selected to provide a selected angle of incline relative to a vertical plane. As discussed above, the angle of incline is selected to maximize the solar collection performance of the solar heat exchanger 512.

Preferably the support stand 604 is made of low cost components and of a simple construction. For example, commercial and home building grade light gage steel channel beams can be used to form the base portion 608 and heat exchanger support 612. In other embodiments, the base portion 608 and heat exchanger support 612 portions can be made at least partially of wood. The support stand 604 can be any suitable size. For example, in one embodiment, the support stand 604 defines a rectangular perimeter having dimensions of about 53 inches (135 centimeter) by about 72 inches (183 centimeter). The rectangular perimeter is defined in the inclined plane that contains a cover member of the solar heat exchanger 512 in one embodiment. The rectangular perimeter comprises the footprints of the base portion 608 of the support stand 604 in another embodiment. In one arrangement, up to six discrete heat exchanger are installed in a single such frame. The heat exchangers are about 18 inches (46 centimeters) by about 36 inches (91 centimeters) in one embodiment. These materials are inexpensive and help to maintain the economical nature of the system.

In one low cost application, the support stand 604 is fixed in nature and does not in any manner track the sun during the day. In other arrangements, the support stand 604 can be configured to move with the sun, e.g., by altering the angle of inclination of the heat exchanger support 612. In one arrangement, the support stand 604 is provided with a plurality of seasonal configurations. For example, the angle of inclination of the plane in which the cover member of the solar heat exchanger 512 resides can be altered by raising or lowering at least one of the upper and lower ends 616, 620 of the heat exchanger support 612. In one embodiment, the heat exchanger support 612 has three discrete settings, each setting being optimized for a season, such as a summer setting, a winter setting, and a spring and fall setting to put the solar heat exchanger 512 closer to the best position for collecting solar energy flux. Providing some adjustability is particularly useful in winter months when the solar flux is the lowest. In another embodiment, more than three distinct settings are provided. For example, a setting can be provided for each month of the year.

Figure 7:
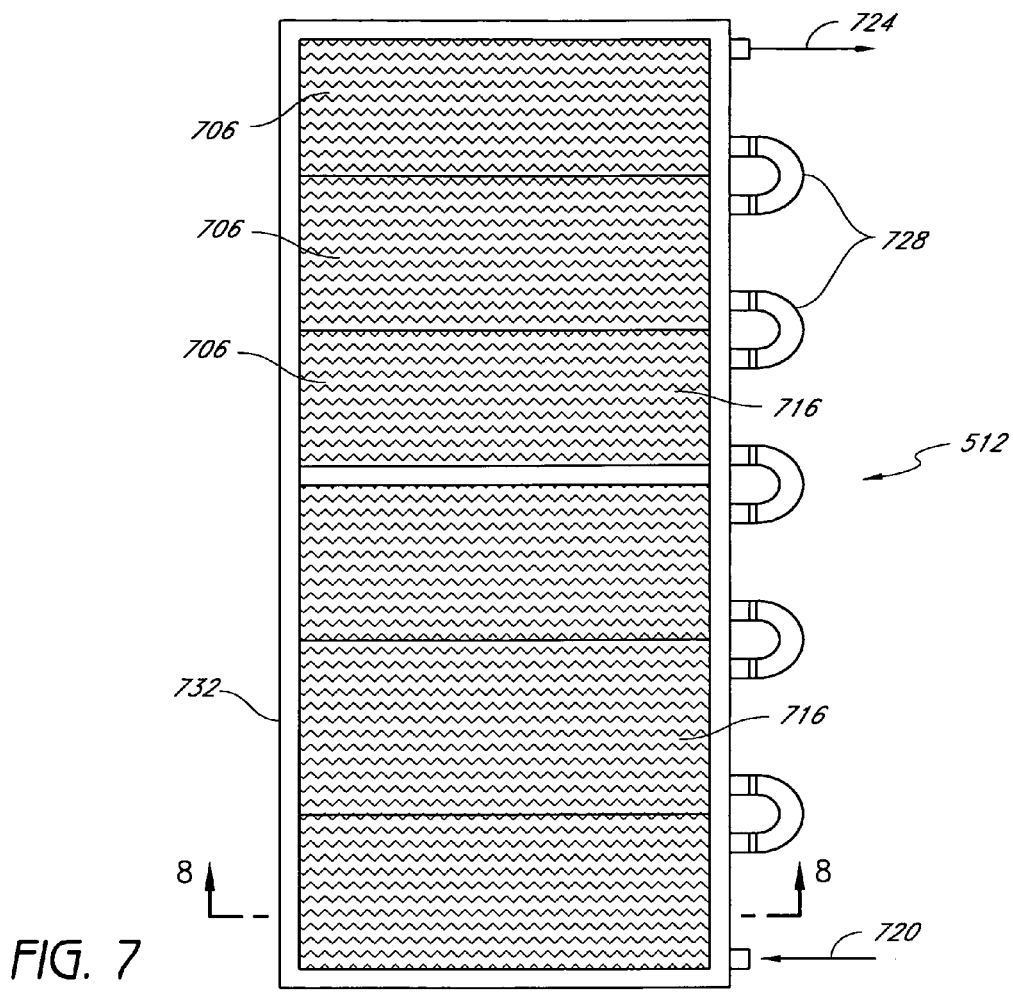
FIG. 7 is a top view of one embodiment of a heat exchanger.
Figure 8:
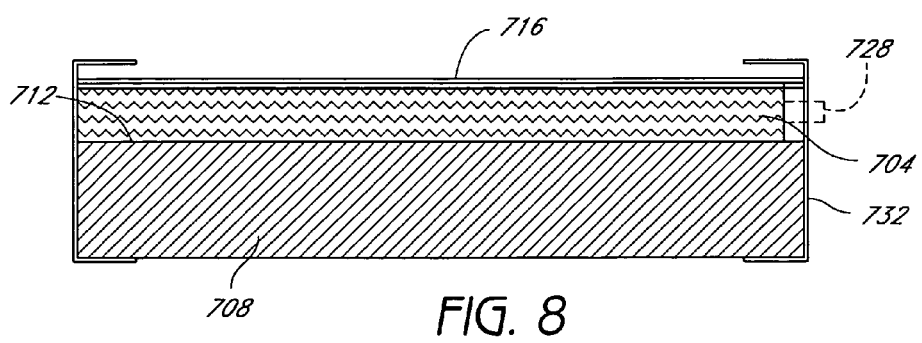
FIG. 8 is a cross-section view of the heat exchanger of FIG. 7 taken through section plane 8—8.

FIGS. 7 and 8 illustrate the construction of one embodiment of a solar heat exchanger 512. The solar heat exchanger 512 includes a heat exchanger section 704, an insulator 708, and a heat absorber 712. The heat absorber 712 can take any suitable form that tends to increase absorption of incident solar energy such that less or no incident energy is reflected or otherwise lost. Absorption is enhanced by making the absorber 712 dark in color, e.g., black. One low cost material that can be used to form the absorber 712 is tar paper.

The heat exchanger section 704 can take any suitable form. As discussed above, stock automotive condensers can be used in the solar heat exchangers 512. Preferably the heat exchanger section 704 includes at least one heat exchanger 706, which can include at least one of a stock automotive condenser and a radiation section heat exchanger. More generally, the heat exchanger section 704 preferably includes a compact finned tube arrangement to provide good performance and minimize the spaced needed for the system. Preferably the heat exchanger section also includes a cover member 716 that is substantially transparent to the solar energy flux such that the flux can pass therethrough. The cover member 716 protects other portions of the heat exchanger section 704 as discussed further below. In one arrangement, the cover member 716 is a sheet of glass having a thickness of about one-eighth inch (3 mm).

The heat exchanger section 704 also includes an inlet 720, an outlet 724, and one or more conduits 728 configured to convey fluid between adjacent heat exchangers 706 of the heat exchanger section 704.

Preferably at least some of the components of the heat exchanger section 704 are supported and held together by a frame 732. The frame 732 can take any suitable form. In one embodiment, the frame 732 is formed of standard light gage steel members that are configured to hold components of the heat exchanger section 704.

Figure 7A:
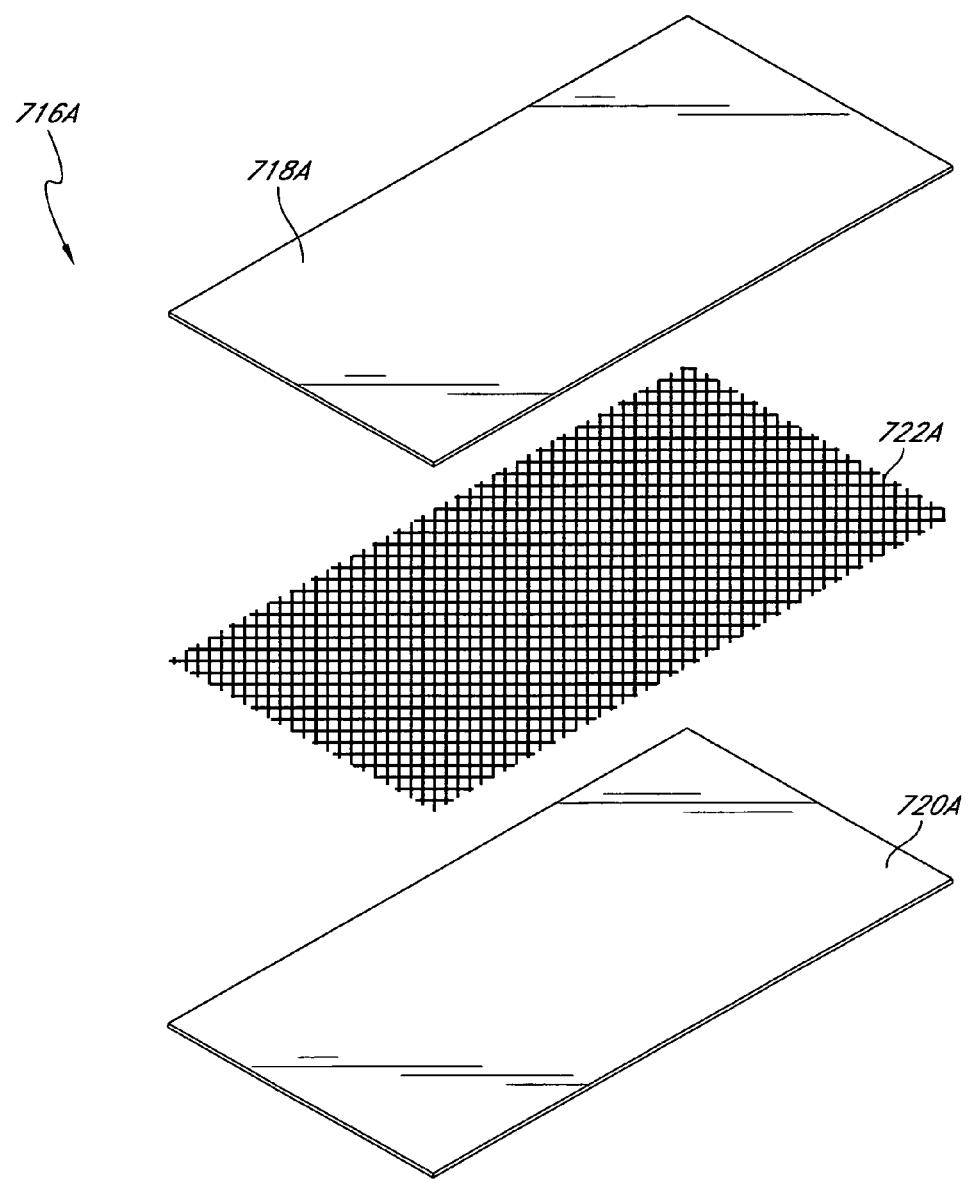
FIG. 7A is an exploded view of a portion of a solar heat exchanger showing one variation of a cover member.

A number of variations of the solar heat exchanger 512 are contemplated. For example, as shown in FIG. 7A, the cover member 716 can be modified to increase the amount of heat that can be held in the heat exchanger 512. In one modification, a cover member 716A includes two panes of glass or other transmissive material, with a first pane 718A facing the outside of a heat exchanger and a second pane 720A being located between the first pane 718A and a heat exchanger section of a heat exchanger. Two panes are advantageous in that a small volume configured to contain a small amount of air forming an insulting layer if formed between the panes. This insulating layer, along with the panes 718A, 720A, increases the amount of heat that can be held in the heat exchanger 512. One or more spacers 722A can be positioned between the panes 718A, 720A to define the size of the insulating layer. For example, an appropriately sized mesh sheet, e.g., chicken-wire can be placed between the panes 718A, 720A to help define the insulating layer. Other techniques for insulating a heat exchanger can be incorporated as well to further increase the temperature inside the heat exchanger. Increasing the temperature inside the heat exchanger increases the temperature rise of the fluid therein.

Figure 7B:
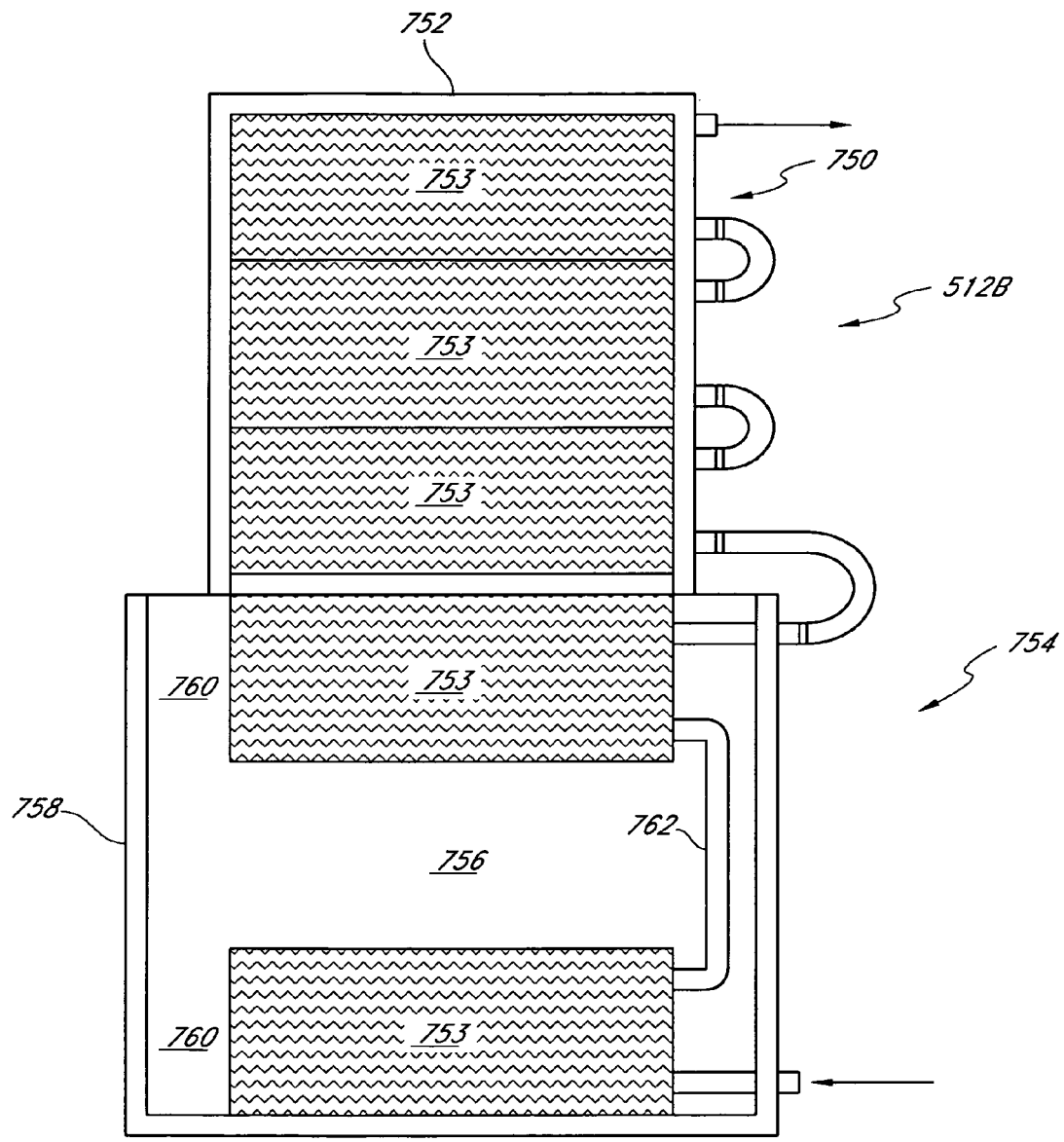
FIG. 7B is a top view of another variation of heat exchanger having a preliminary heat section and a booster section.

In another variation shown in FIG. 7B, a solar heat exchanger 512B is configured with a preliminary heat section 750 and a booster section 754. The preliminary heat section 750 is configured to provide a high rate of heat transfer to the working fluid collected in the preliminary heat section. The preliminary heat section 750 can be configured similar to the half of the heat exchanger 512 closest to the inlet 720. The booster section 754 is configured to maximize the internal temperature of an enclosure through which a heat storage or a working fluid flows to further raise the temperature of the fluid, which temperature is already elevated by passing through the preliminary heat section 750.

In one embodiment, the preliminary heat section 750 is similar to the heat exchanger section 704. For example, the preliminary heat section 750 can include an enclosure 752 and a plurality of automotive-type heat exchangers 753 that fully occupy the enclosed volume of the enclosure 752. In this configuration the heat exchangers provide a high rate of heat transfer to the fluid. This configuration maximizes the heat transfer surface area and therefore the heat transfer capacity for the volume in the enclosure 752 of the preliminary heat section 750. As a result, the temperature inside the enclosure 752 is maintained low relative to the booster section 754, as discussed further below. The temperature of the fluid entering the preliminary heat section 750 is relatively low, so a significant temperature rise in the fluid occurs in the preliminary heat section 750.

In some applications, temperature rise in the fluid in the preliminary heat section 750 progressively decreases, in some cases becoming somewhat asymptotic. For example, in one arrangement, the working fluid flows in a serial fashion though the heat exchangers in the preliminary heat section 750. If three heat exchangers are provided in the preliminary heat section 750, the temperature rise across the third heat exchanger is less than the temperature rise across the second heat exchanger and is much less than the temperature rise across the first heat exchanger. Additional heat exchangers would provide progressively smaller temperature rise for the fluid flowing therethrough. For these applications, the booster section 754 can be configured to provide to increase the temperature rise in the booster section of the heat exchanger 512A.

In one embodiment, the booster section 754 is configured to increase the temperature rise by better insulating the booster section 754. For example, the cover 716A of FIG. 7A can be provided in the booster section 754. In another arrangement, the booster section 754 includes fewer heat exchangers than are provided in the preliminary heat section 750 but with the same enclosed volume. For example, in a housing of the same size, two heat exchangers can be provided, with unoccupied space 756 between the heat exchangers 753. In another arrangement, an enclosure 758 is provided that is larger than the enclosure 752. The enlarged enclosure 758 provides unoccupied space 760 between at least one side of the heat exchanger(s) 753 and the enclosure 758. These arrangements reduce the heat transfer capacity for the enclosed volume of the enclosure 758. By decreasing the heat transfer capacity, the temperature in the enclosure 758 is permitted to increase, which in turn enables the temperature rise in the fluid flowing through the enclosure 758 to be greater than the temperature rise in the half of the heat exchanger 512 closest to the outlet 724. Other features configured to increase the capture of heat in the enclosure 758 can also be adopted, such as positioning tar paper or another solar energy absorbing material at the base of the unoccupied spaces 756, 760.

Another advantage of the enclosure 758 is that at least a portion of the unoccupied spaces 756, 760 can be used to route one or more conduits 762 that comprise a portion of a flow path between discrete heat exchangers 753. As discussed above, the temperature within the enclosure 758 is elevated due to the collection and retention of heat therein. By routing the conduit 762 within the enclosure 758, heat loss from the heat storage fluid flowing therein will be less than if the conduit 762 were routed outside the enclosure 758. In other embodiments, an externally routed conduit can be used, such as where the conduit is well insulated, access to the conduit without opening the enclosure 758 is needed, or where heat loss through the conduit is otherwise not significant.

Figure 9:
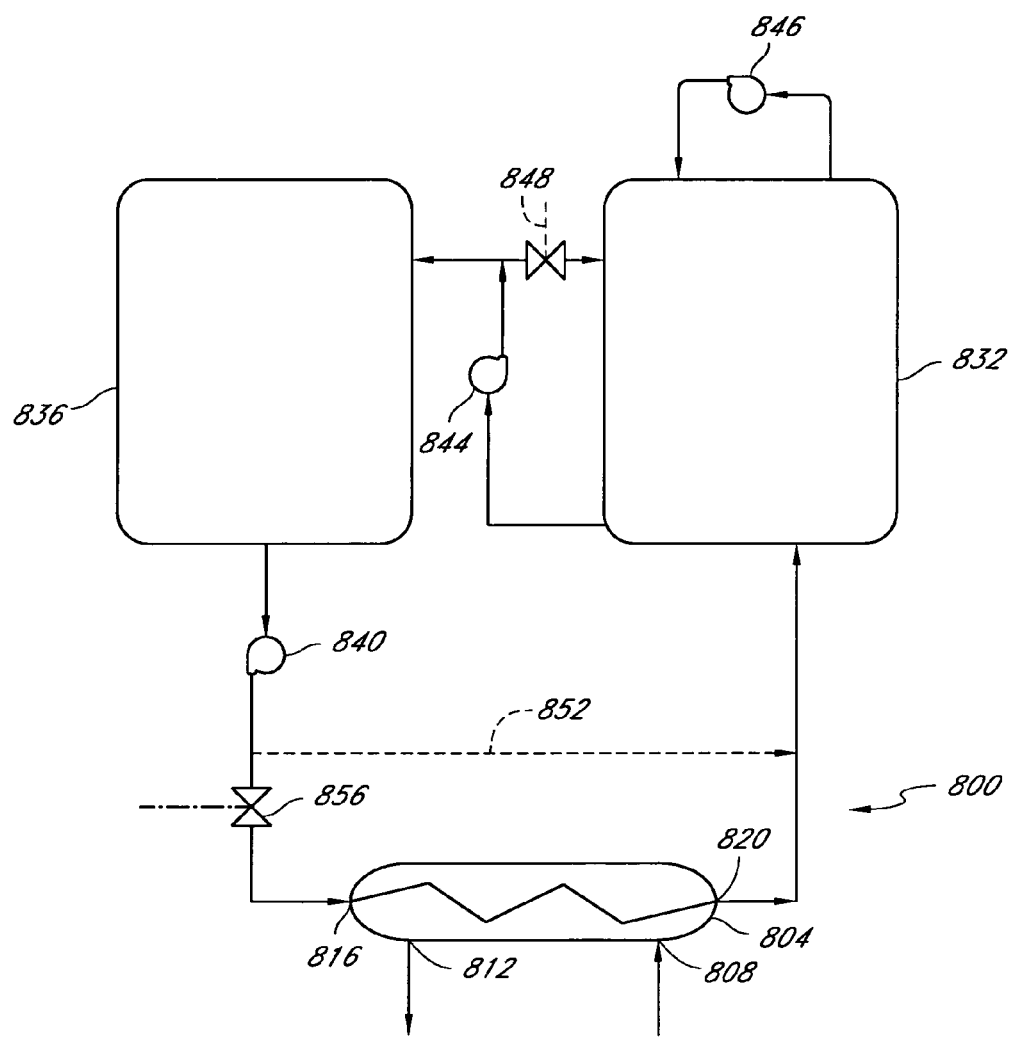
FIG. 9 illustrates one variation of a cooling system that can be used to condense the working fluid.

FIG. 9 illustrates another variation of a cooling system 800 that can be used to cool, to condense, or to cool and condense the working fluid in any of the foregoing systems. A variation of the cooling system 800 is shown in FIG. 2 and the discussion in connection therewith also applies to the cooling system 800. The system 800 includes a condenser 804, which may be similar to any of the condensers described herein. The condenser 804 has a working fluid inlet 808 through which working fluid from an electric power generation loop enters and a working fluid outlet 812 through which the working fluid exits the condenser. The condenser 804 also includes a cooling fluid inlet 816 and a cooling fluid outlet 820 through which cooling fluid enters and exits the condenser respectively. The condenser 804 is configured such that the cooling fluid is proximate the working fluid, promoting heat transfer therebetween and corresponding removal of heat from the working fluid in the condenser 804.

The system 800 also includes at least one cooling fluid tank for storage of the cooling fluid. In one embodiment, the system 800 includes a hot storage tank 832 and a cool storage tank 836. The tanks 832, 836 can be of any suitable construction. The tanks 832, 836 can be made of a tough rubberized fabric material. For example, in one embodiment, the tanks are generally low profile having a relatively large exposed surface area configured to enhance radiation and convection cooling with the atmosphere around the tanks. In one embodiment, each of the tanks is of large enough capacity to hold at least an entire day's demand for cooling fluid for the condenser 804. Thus, the cooling fluid can be pumped from the tank 836 through the condenser 804 (e.g., by a pump 840) without requiring the cooling fluid to be re-circulated through the condenser the same day. In other embodiment, some recirculation is acceptable, such as where the configuration of the tanks 832, 836 or the ambient conditions enable a significant amount of heat to be removed from the cooling fluid. In some applications, the amount of cooling fluid capacity in the tanks 832, 836 is sufficient to enable the condenser 804 to run for about six to eight hours or more with little or no recirculation of the cooling fluid. The tanks 832, 836 can be configured as large, flexible tanks of a thick rubberized material and can be large, flat and rectangular in shape.

At least one of the tanks 832, 836 is configured to minimize or decrease solar gain or the absorption of solar energy flux during the daytime and to maximize or enhance heat transfer out of the at least one tank during the nighttime. One technique for maximizing or enhancing heat transfer out of at least one of the tanks 832, 836 is by providing a relatively large exposed top surface area. In one embodiment, at least one of the tanks 832, 836 can be configured with a capacity of about 50,000 gallon, which volume can be defined within a flexible container that is about 65 feet long, about 23 feet wide, and about 5 feet, 6 inches high. These dimensions are representative and other sized and shaped tanks can also work. For example, a tank that has a larger top surface area will be able to transfer more heat by radiation as discussed below. Thus, a tank with a surface area of about 1500 square feet or more could also work. In some applications where space is not a constraint, an even larger footprint tank could work, e.g., one having about 2000 square feet or more of exposed top surface area. A tank with 5000 square feet or more of exposed top surface area could also work. The large top surface area of these tanks can be exposed to the sky and to the ambient environment. Such exposure produces a significant amount of heat transfer by at least one of convection and radiation from the top surface of the tank. Preferably the hot storage tank 832 has the top surface area exposed to the sky. On a clear night, radiation to the night sky and to space extracts a significant amount of heat from the large surface area tank. Convection with the adjacent air also extracts a significant amount of heat that is a function of the temperature difference between the ambient and the tank.

The performance of the tanks 832, 836 can be further enhanced by reducing solar gain during the day. In one arrangement, the one or more of the tanks 832, 836 could be configured not to absorb solar energy, e.g., by reflecting a substantial portion of the incident solar energy. The absorption of at least one of the tanks 832, 836 can be reduced by making them of a light color, e.g., white, to minimize heating in the day. Another way to improve the performance of the tanks 832, 836 is to provide a pump 846 to circulate the cooling liquid within one of the tanks. The pump 846 can be fluidly coupled with one tank by a first conduit that delivers cooling liquid to the pump and by a second conduit that delivers cooling liquid from the pump back to the cooling tank. The pump 846 causes the cooling liquid to mix so that substantially all portions of the volume of the cooling liquid are moved adjacent to the top surface during the cooling process. In another variation a pump could be positioned within one of the tanks 832,836 to mix the cooling liquid to enhance convective and radiative cooling therein.

It is anticipated that in many environs where the systems described herein can be deployed, nighttime and early morning temperatures will be significantly below daytime temperatures, e.g., at least about 20–30° Fahrenheit under daytime temps, to provide cooling. It is believed that the embodiments and techniques described herein will reduce the average temperature of the cooling liquid in the tanks to close to the nighttime ambient temperature, e.g., reducing the average temperature by about 20–25° or about 20–30° Fahrenheit. It is also possible that the decrease in average temperature of the cooling liquid can exceed the ambient air temperature difference between nighttime and daytime conditions on a clear night due to radiation from the top surface.

As discussed above, the tanks 832, 836 are generally low profile, which in this context means they are low to or close to the ground. This construction is advantageous in that during the cooler nighttime and early morning periods, the cooler air is heavier and sinks to near the ground, providing a greater temperature difference between the local ambient temperature near the ground and the temperature within the tanks, enhancing heat transfer.

In addition to the convention and radiation effects that correspond to the tanks described herein, addition heat transfer by conduction is expected out bottom of the tanks into support structures in contact with the tanks 832, 836, e.g., into the ground. Various techniques can be deployed to achieve both conduction and convection out of the bottom surface, e.g., creating some air gaps underneath the tanks to enhance convection underneath the tanks. One technique for providing air gaps is by placing on a bed of fairly coarse gravel can be placed beneath the tanks. A plurality of voids will be defined by the gravel, which permit air to move and thereby convection to take place. Of course, other small void creating objects could be used in place of gravel. But gravel is advantageous in that it is inexpensive and readily available at many worksites.

In operation, during daytime, cool water is pumped from the cool storage tank 836 through the condenser 804. As discussed above, due to the proximity to the working fluid, heat is absorbed by the cooling fluid, causing the temperature of the cooling fluid to be increased, e.g., to between about 80 and about 110 degrees F. This warm water is pumped into the hot storage tank 832 and held there until the end of the day. During the evening, the temperature of the cooling fluid in the hot storage tank 832 is reduced by natural heat loss via convection to air, conduction to ground, and radiation to the sky and to space. This nighttime cooling can last for eight to ten hours or longer and can reduce the temperature of the cooling fluid significantly, e.g., by about 20 to about 30 degrees F. Prior to start of operation next day, the cooled cooling fluid is pumped to the cool storage tank 832 (e.g., by a pump 844). In some arrangements, at least the cool tank 832 is shaded minimize heat gain of the cooling fluid in the tank during the day.

In one variation of the system 800, a valve 848 is provided that can be opened or closed to permit the fluid in the tank 832 to be circulated to enhance cooling. Water also can be pumped back and forth between tanks during the evening, further enhancing convection cooling. In one arrangement, a cut-off conduit 852 and another valve 856 can be used to cut-off the condenser 804 from the balance of the system 800 so that the fluid can be circulated between the tanks 832, 836.

II. Performance of Ecnomical Solar Thermal Power Generation Systems

The performance of some features of the systems described above has been measured. These measurements show that the system is capable of efficiently collecting solar flux for converting a working fluid from a liquid to a gas-phase to drive a generator, as discussed above.

More particularly, the performance of one embodiment of a solar collector similar to the collector 504 was tested. The test was performed in La Jolla, Calif. on a day with intermittent slight haze, with an ambient temperature of between 72° and 77° Fahrenheit (22° and 25° C.). The inlet water temperature was 85° Fahrenheit (29° C.). The average solar flux was 270 BTU per hour per square foot. The collector was configured with six heat exchangers similar to the solar heat exchanger 512 and with 19.6 square feet of open area, producing 5292 BTU per hour. The fluid in the collector was water, though, as discussed above, some systems direct a working fluid though the collector, which can comprise water or at least one refrigerant.

Figure 11:
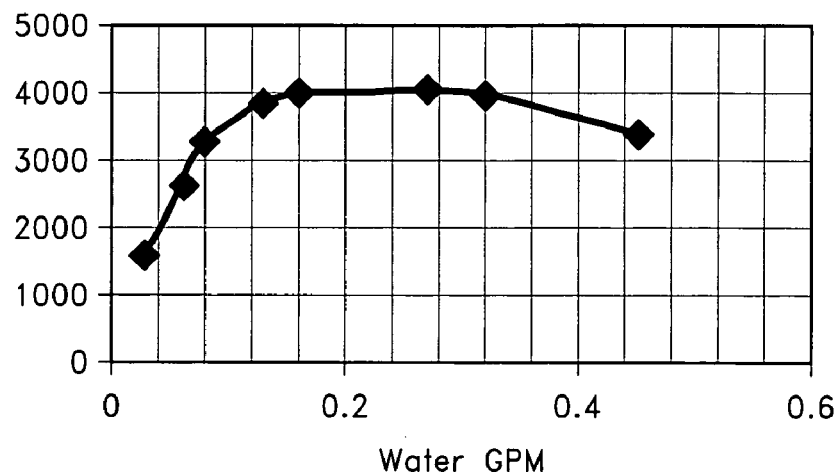
FIG. 11 is a graph that illustrates the heat output for a solar collector.

FIG. 11 illustrates the heat output for the collector. The x-axis illustrates the water flow rate through the collector in gallons per minute (GPM). The y-axis illustrates heat output in BTU per hour for the collector. For this arrangement, the maximum BTU output rate of about 4000 BTU per hour was achieved with a flow rate through the collector in the range of about 0.16 to about 0.30 gallons per minute. At lower flow rates, the heat output was observed to decrease significantly below about 0.1 gallons per minute. At flow rates above 0.3 gallons per minute, the heat output also was observed to decrease. The decrease in heat output above about 0.3 gallons per minute was less dramatic than the decrease in heat output below about 0.1 gallons per minute.

FIG. 11 suggests that in some applications, the systems described herein should be operated at a fluid flow rate of about 0.32 gallons per minute or less. FIG. 11 also suggests that in some applications, the systems described herein should be operated at a fluid flow rate of about 0.10 gallons per minute or more. In some applications flow rates above about 0.32 gallons per minute and below about 0.10 gallons per minute will work, but not as efficiently. Because the curve is relatively flat between about 0.16 and about 0.32 gallons per minute, this flow rate range may be particularly advantageous.

Figure 12:
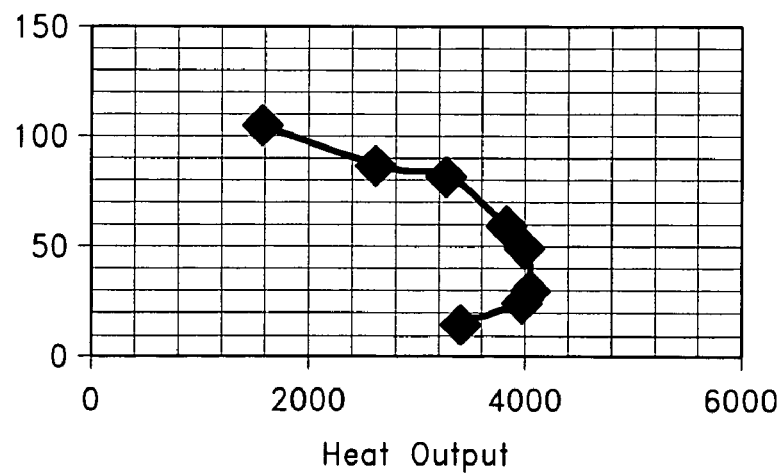
FIG. 12 is a graph that illustrates temperature rise across a solar collector versus heat output.

FIG. 12 illustrates temperature rise across a solar collector versus heat output. In particular, the x-axis shows heat output in BTU per hour for the solar collector and the y-axis shows temperature rise across the solar collector. The maximum heat output was achieved when the temperature rise was about 50 degrees Fahrenheit (28° Celsius). The following figure illustrates that with temperature rise falling off more steeply with decreasing flow.

Figure 13:
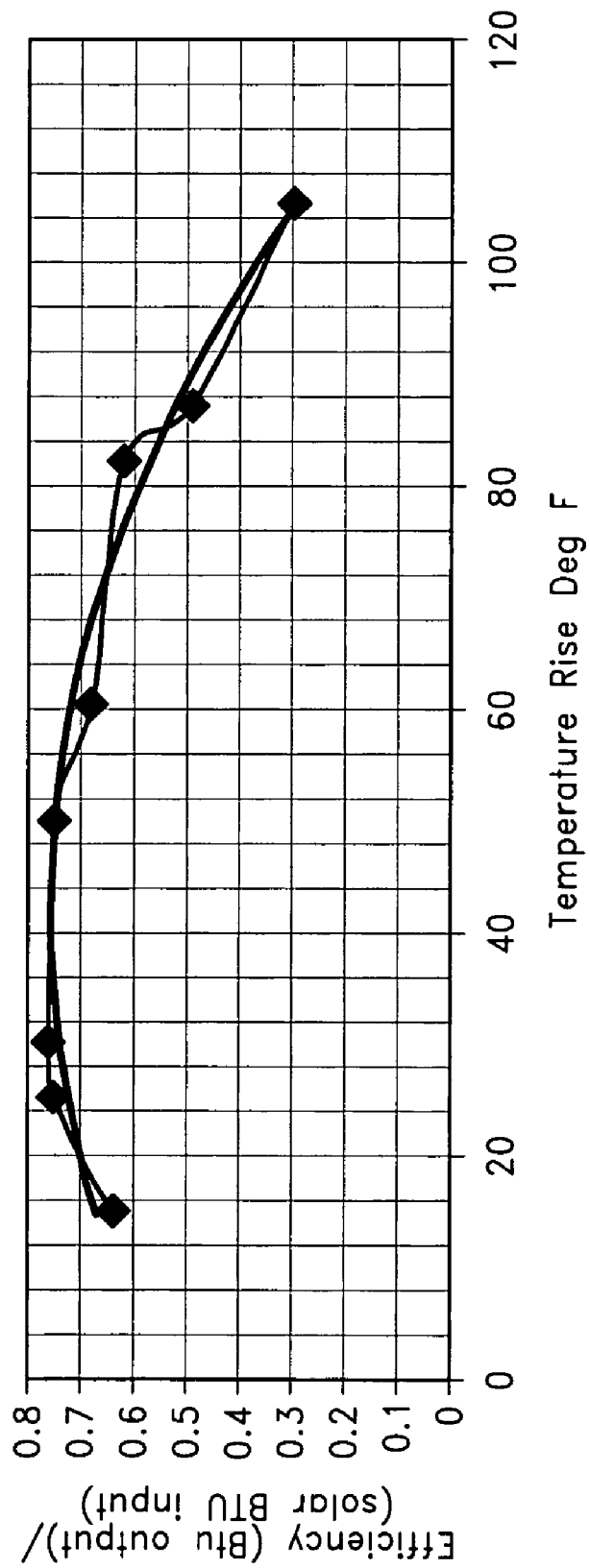
FIG. 13 is a graph that illustrates thermal efficiency versus temperature rise.

FIG. 13 illustrates thermal efficiency versus temperature rise. Thermal efficiency is calculated and plotted as a ratio of heat output to solar flux input. In particular, the ratio of BTU output to solar BTU input is compared with temperature rise across the collector. The figure illustrates that the collector had efficiency in the range of about 70 to about 75 percent when operating in a 40 to 60 degree temperature rise range. FIG. 13 also shows that the efficiency of the collector remains relatively high at lower fluid temperature rise values. Thus, the collector may have adequate performance at lower temperature rises.

Some inefficiency in the collector is believed to be due to heat loss, e.g., from surfaces upon which solar flux does not impinge. For example, heat conveyed out of the collector due to convection and radiative heat flux from a back surface (e.g., a surface not exposed to the solar flux). This heat flux is estimated to be about 21 BTU per hour per square foot, which is about seven percent of the solar flux for the days during the test. It is believed that the systems described above will perform adequately where up to about seven percent or more of the solar flux available to the collector is lost from an insulated surface of the collector to atmosphere.

Figure 14:
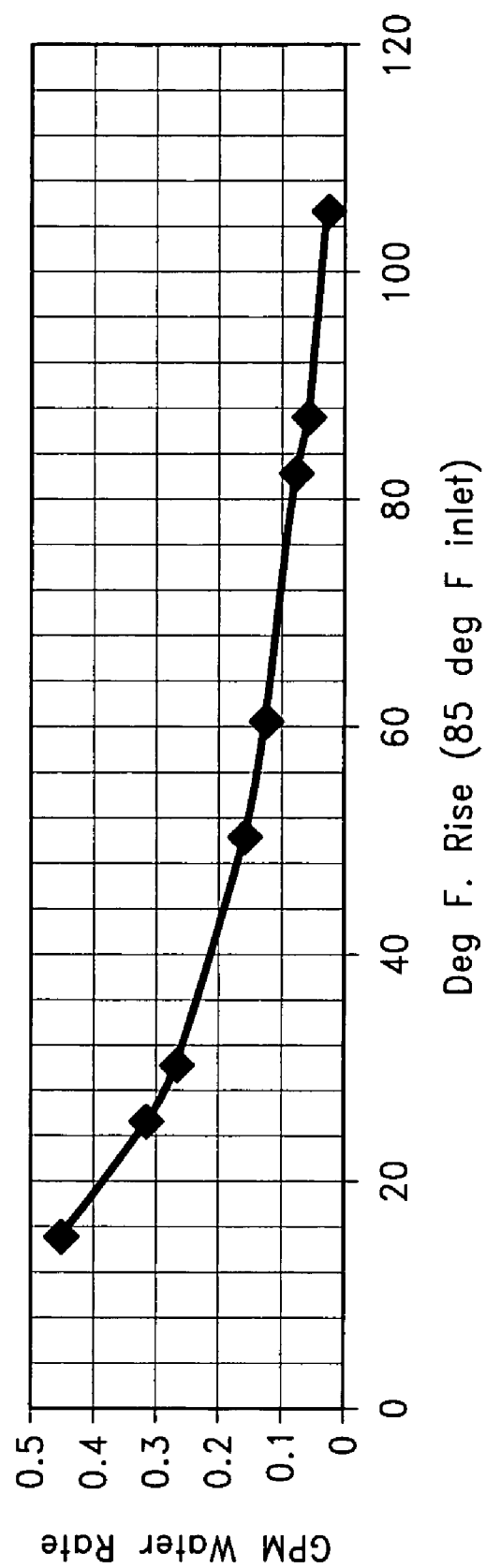
FIG. 14 is a graph that illustrates a measured relationship between flow rate through the collector and temperature rise of the fluid through the collector.

FIG. 14 illustrates a measured relationship between flow rate through the collector and temperature rise of the fluid through the collector. As discussed above, greater flow rate corresponds to a lesser temperature rise. Similarly, a lower flow rate corresponds to a greater temperature rise across the collector. Thus, FIG. 14 provides guidance on the amount of flow needed to provide temperature rises that correspond to more efficient regimes of the systems described above.

Figure 15:
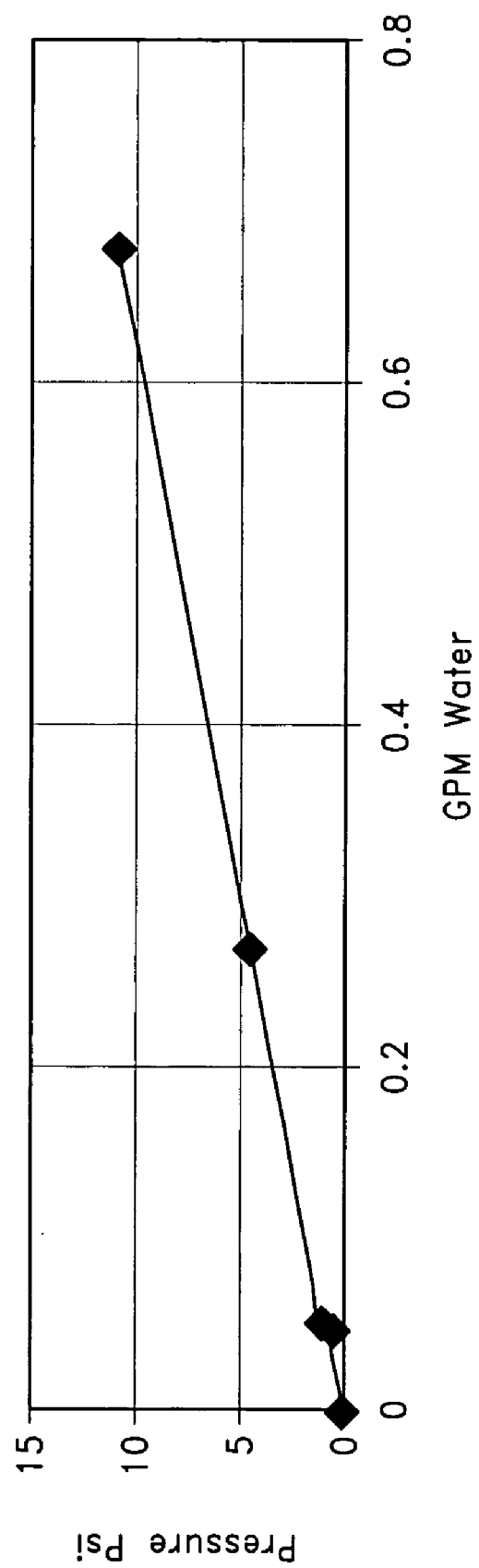
FIG. 15 is a graph that illustrates measurements of flow rate through the collector versus pressure drop across the collector, as well as the pressure drop across the system was not excessive and that both parallel and series arrangements are therefore feasible.

FIG. 15 illustrates measurements of flow rate through the collector versus pressure drop across the collector. FIG. 15 shows that at flow rates of 0.25 gallons per minute, the pressure drop is less than 5 psi. This pressure drop is low enough to enable at least two collectors to be operated in series without requiring a pump with a high horsepower requirement FIG. 15 also illustrates that the pressure drop across the system was not excessive and that both parallel and series arrangements are therefore feasible.

Of course, the foregoing description is that of certain features, aspects and advantages of the present invention, to which various changes and modifications can be made without departing from the spirit and scope of the present invention. Moreover, the apparatus and methods for generating electricity form solar energy need not feature all of the objects, advantages, features, and aspects discussed above. Thus, for example, those skilled in the art will recognize that the invention can be embodied or carried out in a manner that achieves or optimizes one advantage or a group of advantages as taught herein without necessarily achieving other objects or advantages as may be taught or suggested herein. In addition, while a number variations of the invention have been shown and described in detail, other modifications and methods of use, which are within the scope of this invention, will be readily apparent to those of skill in the art based upon this disclosure. It is contemplated that various combinations or sub-combinations of these specific features and aspects of embodiments may be made and still fall within the scope of the invention. Accordingly, it should be understood that various features and aspects of the disclosed embodiments can be combined with or substituted for one another in order to form varying modes of the discussed apparatus and methods for collecting solar energy and putting the energy to use.

What is claimed is:

1. An economical solar generator system wherein the solar energy collector is constructed from a plurality of heat exchangers of the kind used as condensers in automotive air conditioners or as radiators in engines, said solar generator system comprising:
   a plurality of said heat exchangers connected to receive incoming liquefied refrigerant under pressure, the number of such heat exchangers being interconnected being sufficient to raise the temperature of refrigerant to the range of 120° F. to about 190° F. and induce a phase change from the liquid to the gaseous state;
   a pump coupled to said plurality of heat exchangers for providing said incoming refrigerant under pressure;
   an air motor coupled to the outflow heated gas from said plurality of heat exchangers whereby said air motor is rotated by said heated gas;
   an electrical generator coupled to said air motor so that rotation of said air motor causes rotation of said generator; and
   a condenser in fluid communication with said air motor to induce a phase change in said refrigerant from a gas phase to a liquid phase, the output of said condenser coupled to said pump;
   wherein the condenser further comprises a hot storage tank, a cool storage tank, wherein at least one of the hot and cool storage tanks is configured to promote sufficient passive heat transfer to cool the cooling liquid during the night at least to the first temperature.

2. The solar electric generation system of claim 1, wherein the air motor is selected from the group consisting of a turbine air motor, a vane air motor, and piston air motor.

3. The solar electric generation system of claim 1, wherein the air motor further comprises at least one seal resistant to degradation by the refrigerant.

4. The solar electric generation system of claim 1, further comprising a pump coupled with the hot and cool storage tanks to circulate condenser cooling liquid between the tanks.

5. The solar electric generation system of claim 1, wherein the condenser comprises a fan to increase convective cooling of the refrigerant.

6. The solar electric generation system of claim 1, wherein the heat exchangers are a primary heat energy source, and further comprising a secondary heat energy source configured to add heat to the refrigerant.

7. The solar electric generation system of claim 6, wherein the secondary heat energy source comprises a water heater.

8. The solar electric generation system of claim 6, wherein the secondary heat energy source is between the plurality of heat exchangers and the air motor.

9. The solar electric generation system of claim 1, further comprising a frame configured to support the heat exchangers, a cover configured to transmit a substantial portion of incident solar energy to the heat exchangers, and an insulator, the heat exchangers being located between the insulator and the cover.

10. The solar electric generation system of claim 9, wherein the frame is configured to mount to a roof-top or another terrestrial structure.

11. The solar electric generation system of claim 9, wherein the frame is configured to temporary couple the solar panel to a ground surface.

12. The solar electric generation system of claim 1, wherein the refrigerant comprises at least one of HCFC-123, HCFC-124, R-245, and HCFC-236.

13. An economical solar generator system wherein the solar energy collector is constructed from a plurality of heat exchangers of the kind used as condensers in automobile air conditioners or as radiators in engines, said solar generator system comprising:
  a plurality of said heat exchangers connected to receive incoming liquefied refrigerant under pressure, the number of such heat exchangers being sufficient to collect solar energy sufficient to induce a phase change from a liquid to a gas state;
  a pump coupled to said plurality of heat exchangers for providing said incoming refrigerant under pressure;
  an air motor coupled to the outflow heated gas from said plurality of heat exchangers whereby said air motor is rotated by said heated gas;
  an electrical generator coupled to said air motor so that rotation of said air motor causes rotation of said generator; and
  a condenser in fluid communication with said air motor to induce a phase change in said refrigerant from a gas phase to a liquid phase, the output of said condenser coupled to said pump, said condenser comprising:
    a first liquid storage tank configured to hold a volume of cooling liquid sufficient to supply the condenser for at least one day, the cooling liquid being introduced into the condenser at a first temperature; and
    a second liquid storage tank configured to hold at least one day's volume of cooling liquid, the cooling liquid being introduced into the second liquid storage tank at a second temperature that is higher than the first temperature;
  wherein at least one of the liquid storage tanks is configured to promote sufficient passive heat transfer to cool the cooling liquid during the night at least to the first temperature.

14. An economical solar generator system wherein the solar energy collector is constructed from a plurality of primary heat exchangers of the kind used as condensers in automobile air conditioners or as radiators in engines, said solar generator system comprising:
  a plurality of said primary heat exchangers connected to receive an incoming heat storage fluid and configured to collect solar flux;
  a secondary heat exchanger connected to receive the heat storage fluid from said plurality of primary heat exchangers and connected to receive incoming liquefied working fluid under pressure, the secondary heat exchanger being configured to transfer sufficient heat from the heat storage fluid to the working fluid to induce a phase change in the working fluid from a liquid to a gas state;
  a pump coupled to said secondary heat exchanger for providing said incoming working fluid under pressure;
  an air motor coupled to the outflow heated gas working fluid from said secondary heat exchanger whereby said air motor is rotated by said heated gas working fluid;
  an electrical generator coupled to said air motor so that rotation of said air motor causes rotation of said generator; and
  a condenser in fluid communication with said air motor to induce a phase change in said working fluid from a gas phase to a liquid phase, the output of said condenser coupled to said pump, said condenser comprising:
    a first liquid storage tank configured to hold a volume of cooling liquid sufficient to supply the condenser for at least one day, the cooling liquid being introduced into the condenser at a first temperature; and
    a second liquid storage tank configured to hold at least one day's volume of cooling liquid, the cooling liquid being introduced into the second liquid storage tank at a second temperature that is higher than the first temperature;
  wherein at least one of the liquid storage tanks is configured to promote sufficient passive heat transfer to cool the cooling liquid during the night at least to the first temperature.

15. The solar electric generation system of claim 14, further comprising a heat sink connected to receive the heat storage fluid from said heat exchangers and coupled to said secondary heat exchanger, said heat sink having an enclosed volume for storing said heat storage fluid.

16. The solar electric generation system of claim 14, wherein the plurality of heat exchangers are a primary heat energy source, and further comprising a secondary heat energy source configured to add heat to the heat storage fluid.

17. The solar electric generation system of claim 16, wherein the secondary heat energy source comprises a liquid heater.

18. The solar electric generation system of claim 17, wherein the secondary heat energy source is between the plurality of heat exchangers and the heat sink.

19. An economical solar generator system wherein the solar energy collector is constructed from a plurality of heat exchangers of the kind used as condensers in automotive air conditioners or as radiators in engines, said solar generator system comprising:
  a plurality of said heat exchangers connected to receive incoming liquefied refrigerant under pressure, the number of such heat exchangers being interconnected being sufficient to raise the temperature of refrigerant;
  a pressurized refrigerant source coupled to said plurality of heat exchangers;
  an air motor coupled to the outflow heated gas from said plurality of heat exchangers whereby said air motor is rotated by said heated gas;
  an electrical generator coupled to said air motor so that rotation of said air motor causes rotation of said generator; and
  a condenser in fluid communication with said air motor to induce a phase change in said refrigerant from a gas phase to a liquid phase, the output of said condenser coupled to said pressurized refrigerant source, said condenser comprising:
    a first liquid storage tank configured to hold a volume of cooling liquid sufficient to supply the condenser for at least one day, the cooling liquid being introduced into the condenser at a first temperature; and
    a second liquid storage tank configured to hold at least one day's volume of cooling liquid, the cooling liquid being introduced into the second liquid storage tank at a second temperature that is higher than the first temperature;
    wherein at least one of the liquid storage tanks is configured to promote sufficient passive heat transfer to cool the cooling liquid during the night at least to the first temperature.

20. The solar electric generation system of claim 19, further comprising a circulating pump coupled with the first and second liquid storage tanks to enhance heat transfer from the cooling liquid.

21. The solar electric generation system of claim 19, wherein at least one of the first and second liquid storage tanks comprises a flexible enclosure.

22. The solar electric generation system of claim 19, wherein at least one of the first and second liquid storage tanks comprises a volume of at least about 50,000 gallons.

23. The solar electric generation system of claim 19, wherein at least one of the first and second liquid storage tanks comprises a top surface area of at least about 1500 square feet.

24. The solar electric generation system of claim 19, wherein the air motor comprises a rotary vane-type air motor.

25. The solar electric generation system of claim 19, wherein the heat exchangers are a primary heat energy source, and further comprising a secondary heat energy source configured to add heat to the refrigerant.

26. The solar electric generation system of claim 25, wherein the secondary heat energy source comprises a water heater.

27. The solar electric generation system of claim 13, wherein at least one of the first and second liquid storage tanks comprises a flexible enclosure.

28. The solar electric generation system of claim 13, wherein at least one of the first and second liquid storage tanks comprises a volume of at least about 50,000 gallons.

29. The solar electric generation system of claim 13, wherein at least one of the first and second liquid storage tanks comprises a top surface area of at least about 1500 square feet.

30. The solar electric generation system of claim 13, wherein the air motor comprises a rotary vane-type air motor.

* * * * *